US010705198B2

(12) United States Patent
Santra et al.

(10) Patent No.: US 10,705,198 B2
(45) Date of Patent: Jul. 7, 2020

(54) SYSTEM AND METHOD OF MONITORING AN AIR FLOW USING A MILLIMETER-WAVE RADAR SENSOR

(71) Applicant: Infineon Technologies AG, Neubiberg (DE)

(72) Inventors: Avik Santra, Munich (DE); Jagjit Singh Bal, Fremont, CA (US)

(73) Assignee: INFINEON TECHNOLOGIES AG, Neubiberg (DE)

( * ) Notice: Subject to any disclaimer, the term of this patent is extended or adjusted under 35 U.S.C. 154(b) by 272 days.

(21) Appl. No.: 15/937,283

(22) Filed: Mar. 27, 2018

(65) Prior Publication Data

US 2019/0302252 A1 Oct. 3, 2019

(51) Int. Cl.
*G01S 13/58* (2006.01)
*G01S 13/90* (2006.01)
(Continued)

(52) U.S. Cl.
CPC .............. *G01S 13/58* (2013.01); *G01F 1/663* (2013.01); *G01F 1/74* (2013.01); *G01M 1/16* (2013.01);
(Continued)

(58) Field of Classification Search
CPC .......... G01S 13/58; G01S 13/904; G01S 7/41; G01S 13/9064; G01S 7/415; G01S 13/88;
(Continued)

(56) References Cited

U.S. PATENT DOCUMENTS 3,848,253 A * 11/1974 Genuist ............... G01S 13/9023
342/149
4,148,040 A * 4/1979 Lunden ................. H01Q 15/23
343/708
(Continued)

FOREIGN PATENT DOCUMENTS

CN 1463161 A 12/2003
CN 1716695 A 1/2006
(Continued)

OTHER PUBLICATIONS

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.
(Continued)

*Primary Examiner* — Bernarr E Gregory
(74) *Attorney, Agent, or Firm* — Slater Matsil, LLP

(57) ABSTRACT

In accordance with an embodiment, a method of monitoring an air flow includes performing a plurality of radar measurements using a millimeter-wave radar sensor with a line of sight having a component perpendicular to a direction of an air flow, detecting an object in the air flow based on the plurality of radar measurements, calculating a displacement of the object and a size of the object based on the plurality of radar measurements, estimating a velocity of the object based on the calculated displacement, and calculating a risk metric based on the calculated size of the object and estimated velocity of the object.

27 Claims, 20 Drawing Sheets

(51) Int. Cl.
*G01F 1/74* (2006.01)
*G01M 1/16* (2006.01)
*G01F 1/66* (2006.01)
*G01S 7/41* (2006.01)
*G01W 1/00* (2006.01)
*G01P 5/00* (2006.01)
*G01S 13/00* (2006.01)

(52) U.S. Cl.
CPC .............. *G01S 7/41* (2013.01); *G01S 13/904* (2019.05); *G01S 13/9064* (2019.05)

(58) Field of Classification Search
CPC ...... G01S 13/89; G01S 13/583; G01S 7/4817; G01F 1/74; G01F 1/663; G01M 1/16; G01W 1/00; G01P 5/00
See application file for complete search history.

(56) References Cited

U.S. PATENT DOCUMENTS

| | | | |
|---|---|---|---|
| 4,241,347 A | 12/1980 | Albanese et al. | |
| 4,346,383 A * | 8/1982 | Woolcock | G01S 13/88 324/644 |
| 4,380,172 A * | 4/1983 | Imam | G01H 1/003 702/35 |
| 4,384,819 A * | 5/1983 | Baker | G01S 13/88 324/175 |
| 4,413,519 A * | 11/1983 | Bannister | G01S 13/88 342/118 |
| 4,507,658 A * | 3/1985 | Keating | G01S 13/88 342/118 |
| 4,752,781 A * | 6/1988 | Wood | H01Q 21/005 221/5 |
| 5,459,405 A * | 10/1995 | Wolff | G01D 5/145 324/644 |
| 5,818,242 A * | 10/1998 | Grzybowski | F01D 21/04 324/642 |
| 6,147,572 A | 11/2000 | Kaminski et al. | |
| 6,414,631 B1 | 7/2002 | Fujimoto | |
| 6,636,174 B2 | 10/2003 | Arikan et al. | |
| 6,833,793 B2 * | 12/2004 | Dzieciol | G01B 21/16 340/545.3 |
| 7,048,973 B2 | 5/2006 | Sakamoto et al. | |
| 7,057,564 B2 | 6/2006 | Tsai et al. | |
| 7,171,052 B2 | 1/2007 | Park | |
| 7,317,417 B2 | 1/2008 | Arikan et al. | |
| 7,455,495 B2 * | 11/2008 | Leogrande | F01D 21/003 415/1 |
| 7,483,800 B2 * | 1/2009 | Geisheimer | F01D 21/003 702/71 |
| 7,596,241 B2 | 9/2009 | Rittscher et al. | |
| 7,692,574 B2 | 4/2010 | Nakagawa | |
| 7,825,669 B2 * | 11/2010 | Parsons | G01S 13/88 324/637 |
| 7,873,326 B2 | 1/2011 | Sadr | |
| 7,889,119 B2 * | 2/2011 | Evers | F01D 21/003 342/104 |
| 7,889,147 B2 | 2/2011 | Tam et al. | |
| 8,120,522 B2 * | 2/2012 | Tralshawala | G01N 22/02 342/118 |
| 8,228,382 B2 | 7/2012 | Pattikonda | |
| 8,497,805 B2 | 7/2013 | Rofougaran et al. | |
| 8,659,369 B2 | 2/2014 | Rofougaran et al. | |
| 8,731,502 B2 | 5/2014 | Salle et al. | |
| 8,836,596 B2 | 9/2014 | Richards et al. | |
| 8,847,814 B2 | 9/2014 | Himmelstoss et al. | |
| 8,860,532 B2 | 10/2014 | Gong et al. | |
| 8,976,061 B2 | 3/2015 | Chowdhury | |
| 9,172,132 B2 | 10/2015 | Kam et al. | |
| 9,202,105 B1 | 12/2015 | Wang et al. | |
| 9,413,079 B2 | 8/2016 | Kamgaing et al. | |
| 9,495,600 B2 | 11/2016 | Heu et al. | |
| 9,784,827 B2 * | 10/2017 | Shepard | G01S 7/415 |
| 9,823,345 B2 * | 11/2017 | Bechhoefer | G01S 13/88 |
| 9,995,167 B2 * | 6/2018 | Shepard | G01S 13/88 |
| 2003/0179127 A1 | 9/2003 | Wienand | |
| 2004/0238857 A1 | 12/2004 | Beroz et al. | |
| 2006/0001572 A1 | 1/2006 | Gaucher et al. | |
| 2006/0049995 A1 | 3/2006 | Imaoka et al. | |
| 2006/0067456 A1 | 3/2006 | Ku et al. | |
| 2007/0210959 A1 | 9/2007 | Herd et al. | |
| 2008/0106460 A1 | 5/2008 | Kurtz et al. | |
| 2008/0238759 A1 | 10/2008 | Carocari et al. | |
| 2008/0291115 A1 | 11/2008 | Doan et al. | |
| 2008/0308917 A1 | 12/2008 | Pressel et al. | |
| 2009/0073026 A1 | 3/2009 | Nakagawa | |
| 2009/0085815 A1 | 4/2009 | Jakab et al. | |
| 2009/0153428 A1 | 6/2009 | Rofougaran et al. | |
| 2009/0315761 A1 | 12/2009 | Walter et al. | |
| 2010/0207805 A1 | 8/2010 | Haworth | |
| 2010/0253569 A1 * | 10/2010 | Stiesdal | G01B 11/026 342/118 |
| 2011/0299433 A1 | 12/2011 | Darabi et al. | |
| 2012/0087230 A1 | 4/2012 | Guo et al. | |
| 2012/0092284 A1 | 4/2012 | Rofougaran et al. | |
| 2012/0116231 A1 | 5/2012 | Liao et al. | |
| 2012/0195161 A1 | 8/2012 | Little et al. | |
| 2012/0206339 A1 | 8/2012 | Dahl | |
| 2012/0242537 A1 * | 9/2012 | Kluczewski | G01S 13/88 342/192 |
| 2012/0280900 A1 | 11/2012 | Wang et al. | |
| 2013/0027240 A1 | 1/2013 | Chowdhury | |
| 2013/0106673 A1 | 5/2013 | McCormack et al. | |
| 2014/0028542 A1 | 1/2014 | Lovitt et al. | |
| 2014/0070994 A1 | 3/2014 | Schmalenberg et al. | |
| 2014/0145883 A1 | 5/2014 | Baks et al. | |
| 2014/0324888 A1 | 10/2014 | Xie et al. | |
| 2015/0181840 A1 | 7/2015 | Tupin, Jr. et al. | |
| 2015/0185316 A1 | 7/2015 | Rao et al. | |
| 2015/0212198 A1 | 7/2015 | Nishio et al. | |
| 2015/0243575 A1 | 8/2015 | Strothmann et al. | |
| 2015/0277569 A1 | 10/2015 | Sprenger et al. | |
| 2015/0325925 A1 | 11/2015 | Kamgaing et al. | |
| 2015/0346820 A1 | 12/2015 | Poupyrev et al. | |
| 2015/0348821 A1 | 12/2015 | Iwanaga et al. | |
| 2015/0364816 A1 | 12/2015 | Murugan et al. | |
| 2016/0018511 A1 | 1/2016 | Nayyar et al. | |
| 2016/0041617 A1 | 2/2016 | Poupyrev | |
| 2016/0041618 A1 | 2/2016 | Poupyrev | |
| 2016/0061942 A1 | 3/2016 | Rao et al. | |
| 2016/0061947 A1 | 3/2016 | Patole et al. | |
| 2016/0098089 A1 | 4/2016 | Poupyrev | |
| 2016/0103213 A1 | 4/2016 | Ikram et al. | |
| 2016/0109566 A1 | 4/2016 | Liu et al. | |
| 2016/0118353 A1 | 4/2016 | Ahrens et al. | |
| 2016/0146931 A1 | 5/2016 | Rao et al. | |
| 2016/0146933 A1 | 5/2016 | Rao et al. | |
| 2016/0187462 A1 | 6/2016 | Altus et al. | |
| 2016/0191232 A1 | 6/2016 | Subburaj et al. | |
| 2016/0240907 A1 | 8/2016 | Haroun | |
| 2016/0249133 A1 | 8/2016 | Sorensen | |
| 2016/0252607 A1 | 9/2016 | Saboo et al. | |
| 2016/0259037 A1 | 9/2016 | Molchanov et al. | |
| 2016/0266233 A1 | 9/2016 | Mansour | |
| 2016/0269815 A1 | 9/2016 | Liao et al. | |
| 2016/0291130 A1 | 10/2016 | Ginsburg et al. | |
| 2016/0299215 A1 | 10/2016 | Dandu et al. | |
| 2016/0306034 A1 | 10/2016 | Trotta et al. | |
| 2016/0320852 A1 | 11/2016 | Poupyrev | |
| 2016/0320853 A1 | 11/2016 | Lien et al. | |
| 2016/0327633 A1 | 11/2016 | Kumar et al. | |
| 2016/0334502 A1 | 11/2016 | Ali et al. | |
| 2016/0349845 A1 | 12/2016 | Poupyrev et al. | |
| 2017/0031006 A1 * | 2/2017 | Conrad | G01S 7/41 |
| 2017/0033062 A1 | 2/2017 | Liu et al. | |
| 2017/0045607 A1 | 2/2017 | Bharadwaj et al. | |
| 2017/0052618 A1 | 2/2017 | Lee et al. | |
| 2017/0054449 A1 | 2/2017 | Mani et al. | |
| 2017/0060254 A1 | 3/2017 | Molchanov et al. | |
| 2017/0070952 A1 | 3/2017 | Balakrishnan et al. | |
| 2017/0074974 A1 | 3/2017 | Rao et al. | |
| 2017/0074980 A1 | 3/2017 | Adib et al. | |

(56) References Cited

U.S. PATENT DOCUMENTS

| | | | |
|---|---|---|---|
| 2017/0090014 A1 | 3/2017 | Subburaj et al. |
| 2017/0090015 A1 | 3/2017 | Breen et al. |
| 2017/0115377 A1 | 4/2017 | Giannini et al. |
| 2017/0131395 A1 | 5/2017 | Reynolds et al. |
| 2017/0139036 A1 | 5/2017 | Nayyar et al. |
| 2017/0170947 A1 | 6/2017 | Yang |
| 2017/0176574 A1 | 6/2017 | Eswaran et al. |
| 2017/0192847 A1 | 7/2017 | Rao et al. |
| 2017/0201019 A1 | 7/2017 | Trotta |
| 2017/0212597 A1 | 7/2017 | Mishra |
| 2017/0364160 A1 | 12/2017 | Malysa et al. |
| 2018/0046255 A1 | 2/2018 | Rothera et al. |
| 2018/0101239 A1 | 4/2018 | Yin et al. |

FOREIGN PATENT DOCUMENTS

| | | | |
|---|---|---|---|
| CN | 101490578 A | 7/2009 | |
| CN | 101585361 A | 11/2009 | |
| CN | 102788969 A | 11/2012 | |
| CN | 102967854 A | 3/2013 | |
| CN | 103529444 A | 1/2014 | |
| CN | 203950036 U | 11/2014 | |
| DE | 102008054570 A1 | 6/2010 | |
| DE | 102011075725 A1 | 11/2012 | |
| DE | 102014118063 A1 | 7/2015 | |
| GB | 2011752 A * | 7/1979 | G01S 13/583 |
| GB | 2055269 A * | 2/1981 | G01S 13/88 |
| GB | 2247799 A | 3/1992 | |
| GB | 2322987 A * | 9/1998 | G01S 13/88 |
| GB | 2322988 A * | 9/1998 | G01S 13/88 |
| GB | 2532585 A * | 5/2016 | G01S 7/4817 |
| JP | 2001174539 A | 6/2001 | |
| JP | 2004198312 A | 7/2004 | |
| JP | 2006234513 A | 9/2006 | |
| JP | 2008029025 A | 2/2008 | |
| JP | 2008089614 A | 4/2008 | |
| JP | 2009069124 A | 4/2009 | |
| JP | 2011529181 A | 12/2011 | |
| JP | 2012112861 A | 6/2012 | |
| JP | 2013521508 A | 6/2013 | |
| JP | 2014055957 A | 3/2014 | |
| KR | 20090063166 A | 6/2009 | |
| KR | 20140082815 A | 7/2014 | |
| WO | 2007060069 A1 | 5/2007 | |
| WO | 2013009473 A2 | 1/2013 | |
| WO | 2016033361 A1 | 3/2016 | |

OTHER PUBLICATIONS

Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004—Mar. 2015, 14 pages.

Deacon, Peter et al., "Frequency Modulated Continuous Wave (FMCW) Radar," Design Team 6 Technical Lecture, Nov. 9, 2011, 27 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter," http://dooringalertsystems.com, printed Oct. 4, 2017, 16 pages.

Filippelli, Mario et al., "Respiratory dynamics during laughter," J Appl Physiol, (90), 1441-1446, Apr. 2001, http://iap.physiology.org/content/jap/90/4/1441.full.pdf.

Fox, Ben, "The Simple Technique That Could Save Cyclists' Lives," https://www.outsideonline.com/2115116/simple-technique-could-save-cyclists-lives, Sep. 19, 2016, 6 pages.

Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Simon, W., et al., "Highly Integrated KA-Band Tx Frontend Module Including 8x8 Antenna Array," IMST GmbH, Germany, Asia Pacific Microwave Conference, Dec. 7-10, 2009, 63 pages.

Suleymanov, Suleyman, "Design and Implementation of an FMCW Radar Signal Processing Module for Automotive Applications," Master Thesis, University of Twente, Aug. 31, 2016, 61 pages.

Thayananthan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, 11 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

* cited by examiner

| Category | Classifier |
|---|---|
| Object weight | Heavy, Light |
| Object velocity | High Velocity, Low Velocity |
| Indicence | Direct Incidence, Indirect Incidence |
| RCS | High, Mid, Low |

*Fig. 4B*

| Category | Classifier |
|---|---|
| Object radial velocity | High Velocity, Low Velocity |
| Angle of Indicence | Direct Incidence, Indirect Incidence |
| RCS | High, Mid, Low |

SYSTEM AND METHOD OF MONITORING AN AIR FLOW USING A MILLIMETER-WAVE RADAR SENSOR

TECHNICAL FIELD

The present invention relates generally to a system and method of monitoring an air flow using a millimeter-wave radar sensor.

BACKGROUND

Applications in the millimeter-wave frequency regime have gained significant interest in the past few years due to the rapid advancement in low cost semiconductor technologies such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal, and determining a distance based on a time delay and/or frequency difference between the transmission and reception of the frequency modulated signal. Accordingly, some radar systems include a transmit antenna to transmit the RF signal, a receive antenna to receive the RF signal, as well as the associated RF circuitry used to generate the transmitted signal and to receive the RF signal. In some cases, multiple antennas may be used to implement directional beams using phased array techniques. A MIMO configuration with multiple chipsets or a multichannel chip can be used to perform coherent and non-coherent signal processing, as well.

SUMMARY

In accordance with an embodiment, a method of monitoring an air flow includes performing a plurality of radar measurements using a millimeter-wave radar sensor with a line of sight having a component perpendicular to a direction of an air flow, detecting an object in the air flow based on the plurality of radar measurements, calculating a displacement of the object and a size of the object based on the plurality of radar measurements, estimating a velocity of the object based on the calculated displacement, and calculating a risk metric based on the calculated size of the object and estimated velocity of the object.

In accordance with a further embodiment, a method of monitoring an air flow includes performing a plurality of radar measurements using a millimeter-wave radar sensor having a line of sight collinear to a direction of an air flow, detecting an object in the air flow based on the plurality of radar measurements, calculating a size and trajectory of the detected object based on the plurality of radar measurements, and calculating a risk metric based on the calculated size of the object and calculated trajectory of the object.

In accordance with another embodiment, a method of monitoring a structural integrity of a rotating object includes performing a plurality of radar measurements of the rotating object using a plurality millimeter-wave radar sensors, creating an inverse synthetic-aperture radar (ISAR) image from the plurality of radar measurements, extracting a micro-Doppler signature of the rotating object from the ISAR image, and estimating the structural integrity of the rotating object from the extracted micro-Doppler signature.

In accordance with further embodiment, a system for monitoring an air flow includes a millimeter-wave radar sensor having a line of sight having a component perpendicular to a direction of an air flow, a processor coupled to the millimeter-wave radar sensor configured to detect an object in the air flow based on radar measurements from the millimeter-wave radar sensor, calculate a displacement of the object and a size of the object based on the radar measurements, estimate a velocity of the object based on the calculated displacement, and calculate a risk metric based on the calculated size of the object and estimated velocity of the object.

BRIEF DESCRIPTION OF THE DRAWINGS

For a more complete understanding of the present invention, and the advantages thereof, reference is now made to the following descriptions taken in conjunction with the accompanying drawings, in which:

FIG. 4B illustrates a table representing embodiment classification foreign object classification scheme;

Figure 1A:
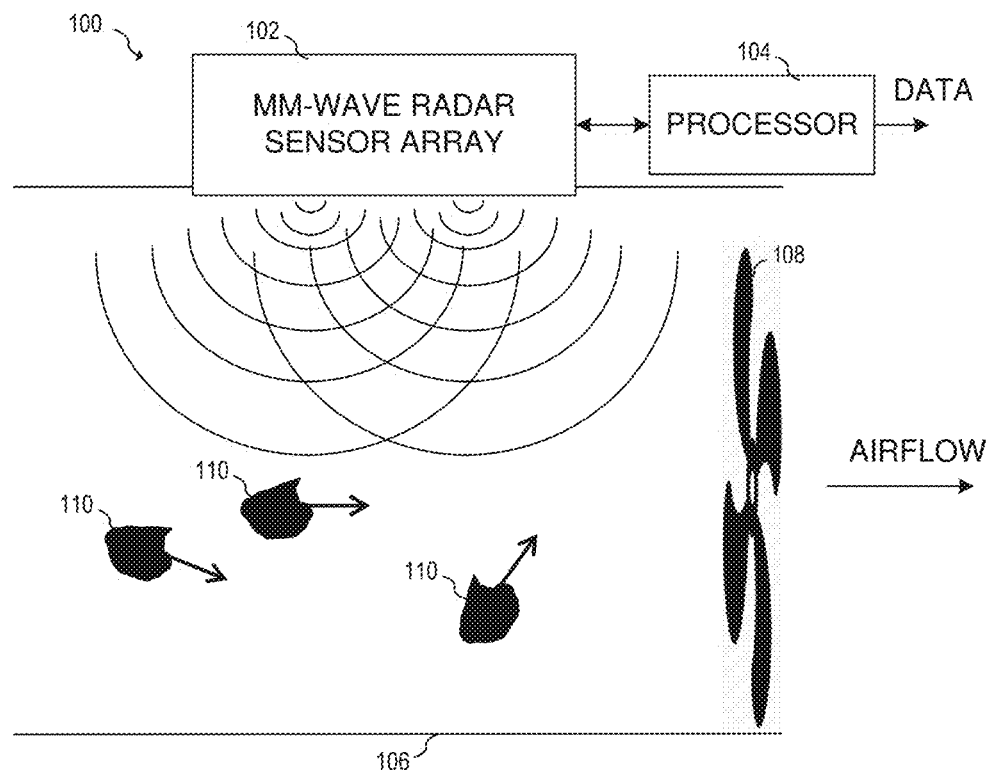
FIGS. 1A and 1B illustrate block diagram of embodiment air flow/fan health monitoring systems.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, a system and method of monitoring an air flow and a fan using a millimeter-wave radar sensor. The invention may also be applied to other RF-based systems and applications that monitor the status flowing or rotating objects.

Monitoring the health of the fans in industrial applications such as rotating motors, fans in wind turbines, wind tunnels, jet engines, and indoor flying applications is helpful, not only from a perspective of cost and maintenance of the fan and its associated machinery, but also from the perspective of the safety of the workers, technicians and users within the immediate vicinity of the fan. In embodiments of the present invention, systems and methods for the automated monitoring and inspection of fans and other rotating objects using millimeter-wave radar monitoring systems are presented. Various embodiments provide for the monitoring of the structural integrity of the fan while it is moving, and for monitoring of moving objects present in the air flow of the fan that might damage or degrade the structural integrity of the fan. By automatically monitoring the structural integrity of a fan, embodiments of the present invention advantageously allow for the ability to predict the remaining lifespan of the fan, thereby allowing proactive maintenance, repair and replacement in a manner that reduces and eliminates operational delays. Monitoring the operation of the fan further advantageously allows for the optimization of operational parameters, such as speed and duration of operation, to prolong the operation of the fan.

Embodiments of the present invention are directed to two aspects of fan monitoring: foreign object detection and dynamic fan performance. A foreign object that flies into a fan might have a major impact on the health, performance and lifespan on the fan depending on the mass and size of the foreign object and its velocity. In worst case conditions, a foreign object striking the blades of a fan has the potential to cause a catastrophic failure that results in fatal injuries and accidents. Accordingly, embodiments of the present invention are configured to monitor the air flow leading toward the fan, identify foreign objects that are moving toward the fan, and determining the degree of risk that a particular foreign object poses to the fan. For example, a large, fast moving object may be assigned a higher degree of risk than a small, slow moving object. In various embodiments, a millimeter-wave radar sensor system monitors the air flow, and determines various parameters such as speed, direction and radar cross-section of foreign object that traverses the air flow. A risk metric is assigned to the object based on the various determined parameters. Maintenance personnel can then be alerted on the bases of the risk metric. In various embodiments, the millimeter-wave radar sensor may have a line of sight having a component perpendicular to or collinear with the air flow of the air flow. Embodiments may also be directed to consumer products, such as fans used for air circulation in a room. In such embodiments, the system could be configured to stop the rotation of a fan in a potentially dangerous situation, such as when a child reaches out his or her hand toward the rotating fan.

The vibrational characteristics of a fan may change as a result of aging, changes in ambient temperature and pressure, and foreign object impact. Thus, by monitoring the dynamic characteristics, such as vibrational characteristics, of the fan, the overall health and status of the fan itself can be assessed. Understanding the fan's vibrating characteristics can help identify the optimal dynamic operating settings under given conditions, and reduce the uncertainties that may arise in the course of visual inspection. In various embodiments, a millimeter-wave radar sensor system monitors the operation of the fan, and the vibrational performance of the fan is extracted using, for example, inverse synthetic-aperture (ISAR) radar techniques. In some embodiments, machine learning techniques are used to analyze the extracted vibrational performance of the fan and provide a health metric of the fan.

Figure 1B:
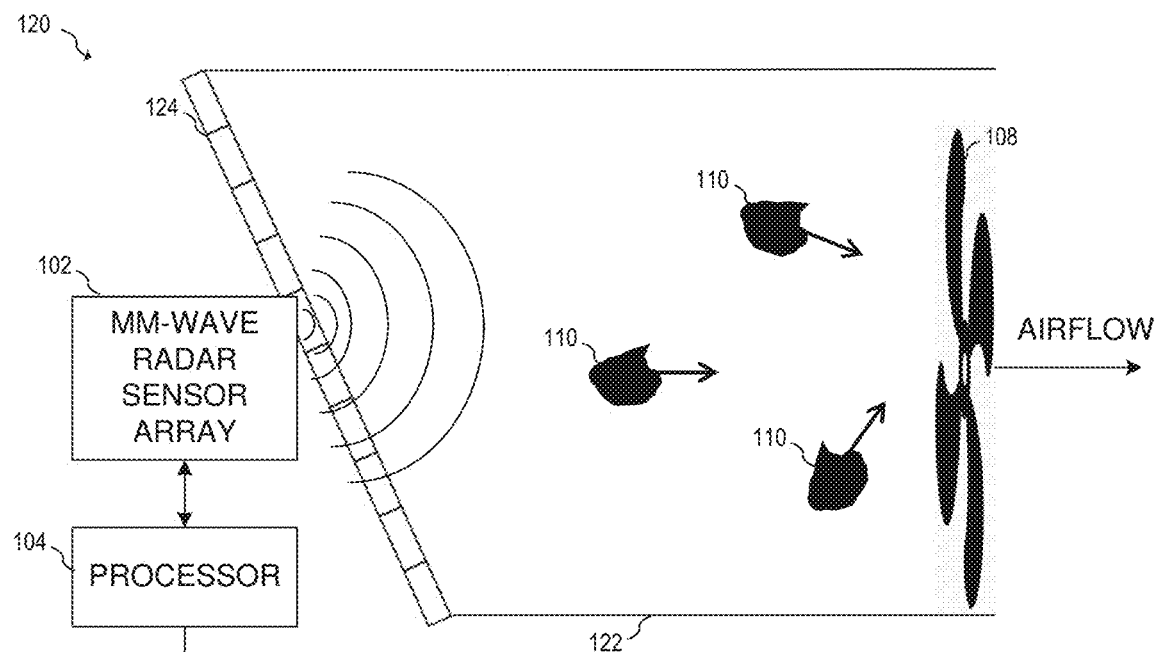

FIGS. 1A and 1B illustrate two primary embodiment air flow and fan health monitoring systems. FIG. 1A is directed to a system in which a radar sensor has a line of sight perpendicular to the direction of air flow, and FIG. 1B is directed to a system in which the radar has a line of sight collinear with the direction of air flow.

FIG. 1A illustrates a block diagram of radar-based air flow monitoring system 100. As shown, fan 108 moves air through air duct 106. Radar-based air flow monitoring system 100 includes a millimeter-wave radar sensor 102 disposed at one side of air duct 106 and having a line of sight perpendicular to the air flow of air duct 106. In some embodiments, the line of sight of radar 102 may disposed at an angle with respect to air duct 106, but has at least one component that is perpendicular to the air flow. Radar-based air flow monitoring system 100 also includes a processor 104 coupled to millimeter-wave radar sensor that controls the operation of millimeter-wave radar sensor 102 and performs various radar signal processing operations on the data produced by millimeter-wave radar sensor 102. During operation, millimeter-wave radar sensor 102 transmits millimeter-wave RF signals that are reflected by objects 110 that move through the air flow of air duct 106. The reflected signals are received by millimeter-wave radar sensor 102 and are converted to a digital representation and processed by processor 104 to determine, for example, whether an object is present in the air flow of air duct 106. The result of this processing produces various data (represented by signal DATA) indicative of the size, radar cross section, trajectory and velocity of objects 110 that flow through the air flow of air duct 106. Thus, radar sensor 102 in conjunction with processor 104 is used to detect and classify Foreign Object events, based on size, velocity of impact and thus the severity to the health of the fan. In various embodiments, radar sensor 102 may include one or more radar transceivers. In one embodiment, radar sensor 102 includes at least two radar transceivers disposed in a linear array collinear with the direction of the air flow.

FIG. 1B illustrates a block diagram of radar-based air flow monitoring system 120 according to a further embodiment in which radar sensor 102 is installed facing the fan 108 at an entrance to air duct 122 and has a line of sight that is collinear with the air flow of air duct 122. While FIG. 1B depicts radar sensor 102 as being attached to vanes or vents 124 present at the entrance to air duct 122, radar sensor 102 may be installed at other points within the air flow of air duct 122. In some embodiments, the line of sight of radar 102 may disposed at an angle with respect to air duct 122, but has at least one component that is collinear to the air flow. Because the line of sight of radar sensor 102 is also directed at fan 108, the radar-based air flow monitoring system 120 may also be used to monitor the structural integrity of fan 108. Similar to the embodiment of FIG. 1A, Radar-based air flow monitoring system 100 includes a processor 104 coupled to millimeter-wave radar sensor that controls the operation of millimeter-wave radar sensor 102 and performs various radar signal processing operations on the data produced by millimeter-wave radar sensor 102.

During operation, millimeter-wave radar sensor 102 transmits millimeter-wave RF signals that are reflected by objects 110 that move through air duct 122 and by fan 108. The reflected signals are received by millimeter-wave radar sensor 102 and are converted to a digital representation and processed by processor 104 to determine, for example, the structural integrity of fan 108, as well as whether an object is present in the air flow of air duct 122. The result of this processing produces various data (represented by signal DATA) indicative of radar cross section, trajectory and velocity of objects 110 that flow through air duct 122. This processing also produces data related to operational parameters of fan 108, for example, vibrational characteristics. Thus, radar sensor 102 in conjunction with processor 104 may be used to detect and classify Foreign Object events, based velocity of impact and thus the severity to the health of the fan, as well as determine the overall health of fan 108. In various embodiments, radar sensor 102 may include one or more radar transceivers.

While FIGS. 1A and 1B illustrate systems that monitor an air flow that flows through ducts 106 and 122, it should be understood that embodiment systems can also be configured to monitor open air flows that are not surrounded or constrained by physical duct or boundary. For example, embodiments systems may be used to monitor the airflow moving toward or moving away from a rotating object, such as a fan. Further embodiments may even be directed to applications that monitor airflows external to an intake or exhaust duct.

Figure 2A:
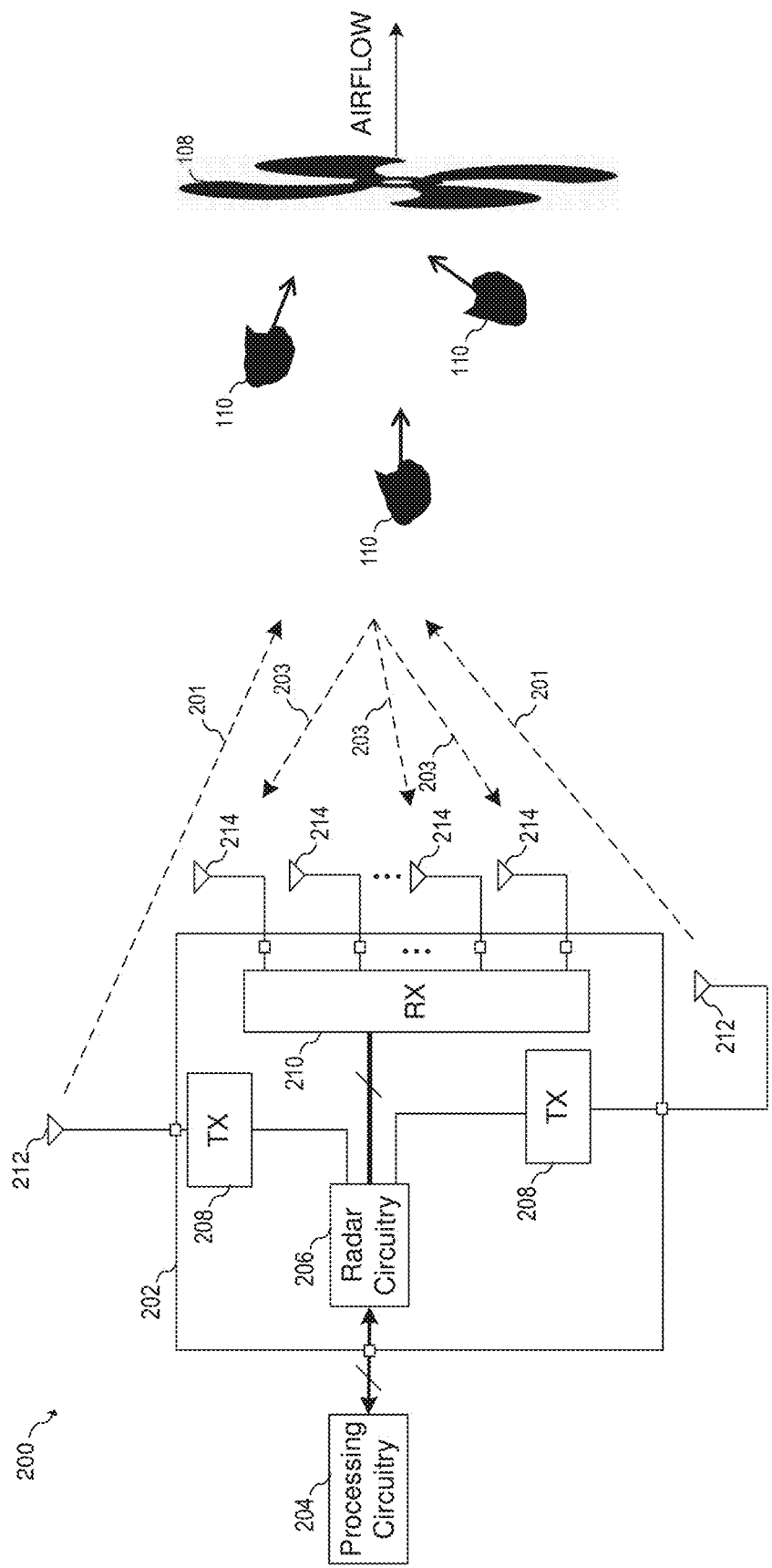
FIG. 2A illustrates a block diagram of a millimeter-wave radar sensor system.

FIG. 2A illustrates a block diagram of a millimeter-wave radar sensor system 200 that may be used to implement millimeter-wave radar sensor circuits used in the various disclosed embodiments. Millimeter-wave radar sensor system 200 includes millimeter-wave radar sensor circuit 202 and processing circuitry 204. Embodiment millimeter-wave radar sensor circuits may be implemented, for example, using a one-dimensional or two-dimensional millimeter-wave phase-array radar that performs measurements on object 110. The millimeter-wave phase-array radar transmits and receives signals in the 30 GHz to 122 GHz range. Frequencies outside of this range may also be used. In some embodiments, millimeter-wave radar sensor circuit 202 operates as a frequency modulated continuous wave (FMCW) radar sensor having multiple transmit and receive channels or a FMCW radar sensor having a single transmit and a single receive channel. Alternatively, other types of radar systems may be used such as pulse radar, and non-linear frequency modulated (NLFM) radar to implement millimeter-wave radar sensor circuit 202.

Millimeter-wave radar sensor circuit 202 transmits and receives radio signals for determining the location and trajectory of foreign objects 110 and/or the position or vibrational characteristics of fan 108. For example, millimeter-wave radar sensor circuit 202 transmits incident RF signals 201 and receives RF signals 203 that are a reflection of the incident RF signals from foreign objects 110 or fan 108. The received reflected RF signals 203 are downconverted by millimeter-wave radar sensor circuit 202 to determine beat frequency signals. These beat frequency signals may be used to determine information such as the location and motion of object 110. In the specific example of FMCW radar, the beat frequency is proportional to the distance between millimeter-wave radar sensor circuit 202 and the fan 108 and/or foreign object 110 being sensed.

In various embodiments, millimeter-wave radar sensor circuit 202 is configured to transmit incident RF signals 201 toward foreign objects 110 and/or fan 108 via transmit antennas 212 and to receive reflected RF signals 203 from foreign objects 110 and/or fan 108 via receive antennas 214. Millimeter-wave radar sensor circuit 202 includes transmitter front-end circuits 208 coupled to transmit antennas 212 and receiver front-end circuit 210 coupled to receive antennas 214.

During operation, transmitter front-end circuits 208 may transmit RF signals toward foreign objects 110 and/or fan 108 simultaneously or individually using beamforming depending on the phase of operation. While two transmitter front-end circuits 208 are depicted in FIG. 2A, it should be appreciated that millimeter-wave radar sensor circuit 202 may include less than or greater than two transmitter front-end circuits 208. Thus, in various embodiments, the number of transmitters can be extended to n×m. Each transmitter front-end circuit 208 includes circuitry configured to produce the incident RF signals. Such circuitry may include, for example, RF oscillators, upconverting mixers, RF amplifiers, variable gain amplifiers, filters, transformers, power splitters, and other types of circuits.

Receiver front-end circuit 210 receives and processes the reflected RF signals from object 110. As shown in FIG. 2A, receiver front-end circuit 210 is configured to be coupled to four receive antennas 214, which may be configured, for example, as a 2×2 antenna array. In alternative embodiments, receiver front-end circuit 210 may be configured to be coupled to greater or fewer than four antennas, with the resulting antenna array being of various n×m dimensions depending on the specific embodiment and its specifications. Receiver front-end circuit 210 may include, for example, RF oscillators, upconverting mixers, RF amplifiers, variable gain amplifiers, filters, transformers, power combiners and other types of circuits.

Radar circuitry 206 provides signals to be transmitted to transmitter front-end circuits 208, receives signals from receiver front-end circuit 210, and may be configured to control the operation of millimeter-wave radar sensor circuit 202. In some embodiments, radar circuitry 206 includes, but is not limited to, frequency synthesis circuitry, upconversion and downconversion circuitry, variable gain amplifiers, analog-to-digital converters, digital-to-analog converters, digital signal processing circuitry for baseband signals, bias generation circuits, and voltage regulators.

Radar circuitry 206 may receive a baseband radar signal from processing circuitry 204 and control a frequency of an RF oscillator based on the received baseband signal. In some embodiments, this received baseband signal may represent a FMCW frequency chirp to be transmitted. Radar circuitry 206 may adjust the frequency of the RF oscillator by applying a signal proportional to the received baseband signal to a frequency control input of a phase locked loop. Alternatively, the baseband signal received from processing circuitry 204 may be upconverted using one or more mixers.

Radar circuitry 206 may transmit and digitize baseband signals via a digital bus (e.g., a USB bus), transmit and receive analog signals via an analog signal path, and/or transmit and/or receive a combination of analog and digital signals to and from processing circuitry 204.

Processing circuitry 204 acquires baseband signals provided by radar circuitry 206 and formats the acquired baseband signals for transmission to an embodiment signal processing unit. These acquired baseband signals may represent beat frequencies, for example. In some embodiments, processing circuitry 204 includes a bus interface (not shown) for transferring data to other components within the structural monitoring system. Optionally, processing circuitry 204 may also perform signal processing steps used by embodiment structural monitoring systems such as a fast Fourier transform (FFT), a short-time Fourier transform (STFT), macro-Doppler analysis, micro-Doppler analysis, vital sign analysis, object classification, machine learning, and the like. In addition to processing the acquired baseband signals, processing circuitry 204 may also control aspects of millimeter-wave radar sensor circuit 202, such as controlling the transmissions produced by millimeter-wave radar sensor circuit 202.

The various components of millimeter-wave radar sensor system 200 may be partitioned in various ways. For example, millimeter-wave radar sensor circuit 202 may be implemented on one or more RF integrated circuits (RFICs), antennas 212 and 214 may be disposed on a circuit board, and processing circuitry 204 may be implemented using a processor, a microprocessor, a digital signal processor and/or a custom logic circuit disposed on one or more integrated circuits/semiconductor substrates. Processing circuitry 204 may include a processor that executes instructions in an executable program stored in a non-transitory computer readable storage medium, such as a memory to perform the functions of processing circuitry 204. In some embodiments all or part of the functionality of processing circuitry 204 may be incorporated on the same integrated circuit/semiconductor substrate on which millimeter-wave radar sensor circuit 202 is disposed.

In some embodiments, some or all portions of millimeter-wave radar sensor circuit 202 may be implemented in a package that contains transmit antennas 212, receive antennas 214, transmitter front-end circuits 208, receiver front-end circuit 210, and/or radar circuitry 206. In some embodiments, millimeter-wave radar sensor circuit 202 may be implemented as one or more integrated circuits disposed on a circuit board, and transmit antennas 212 and receive antennas 214 may be implemented on the circuit board adjacent to the integrated circuits. In some embodiments, transmitter front-end circuits 208, receiver front-end circuit 210, and radar circuitry 206 are formed on a same radar front-end integrated circuit (IC) die. Transmit antennas 212 and receive antennas 214 may be part of the radar front-end IC die, or may be implemented as separate antennas disposed over or adjacent to the radar front-end IC die. The radar front-end IC die may further include conductive layers, such as redistribution layers (RDLs), used for routing and/or for the implementation of various passive or active devices of millimeter-wave radar sensor circuit 202. In an embodiment, transmit antennas 212 and receive antennas 214 may be implemented using the RDLs of the radar front-end IC die.

Figure 2B:
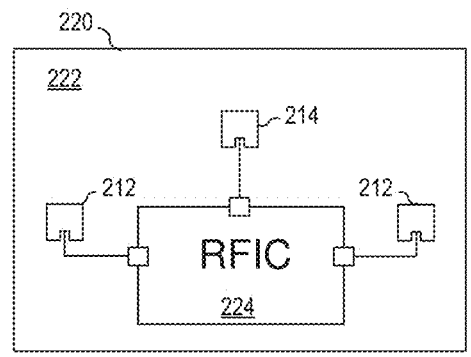
FIGS. 2B-2D illustrate plan views of embodiment millimeter-wave sensor circuits.

FIG. 2B illustrates a plan view of millimeter-wave radar sensor circuit 220 that may be used to implement millimeter-wave radar sensor circuit 202. As shown, millimeter-wave radar sensor circuit 220 is implemented as an RFIC 224 coupled to transmit antennas 212 and receive antenna 214 implemented as patch antennas disposed on or within substrate 222. In some embodiments, substrate 222 may be implemented using a circuit board on which millimeter-wave radar sensor circuit 202 is disposed and on which transmit antennas 212 and receive antennas 214 are implemented using conductive layers of the circuit board. Alternatively, substrate 222 represents a wafer substrate on which one or more RDLs are disposed and on which transmit antennas 212 and receive antennas 214 are implemented using conductive layers on the one or more RDLs.

Figure 2C:
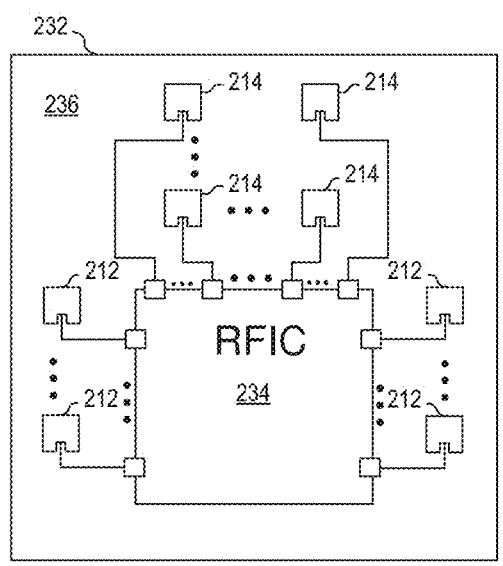

FIG. 2C illustrates a plan view of millimeter-wave radar sensor circuit 232 that includes an array of transmit antennas 212 and an array of receive antennas 214 coupled to RFIC 234 disposed on substrate 236. In various embodiments, transmit antennas 212 may form an array of m antennas and receive antennas 214 may form an array of n antennas. Each of the m transmit antennas 212 is coupled to a corresponding pin on RFIC 234 and coupled to a corresponding transmit circuit within RFIC 234; and each of the n receive antennas 214 is coupled to a corresponding pin on RFIC 234 and coupled to a corresponding receive circuit within RFIC 234. In various embodiments, the array of transmit antennas 212 and the array of receive antennas 214 may be implemented as a uniform array or a linear array of any dimension. It should be appreciated that the implementations of FIGS. 2B and 2C are just two examples of the many ways that embodiment millimeter-wave radar sensor circuits could be implemented.

Figure 2D:
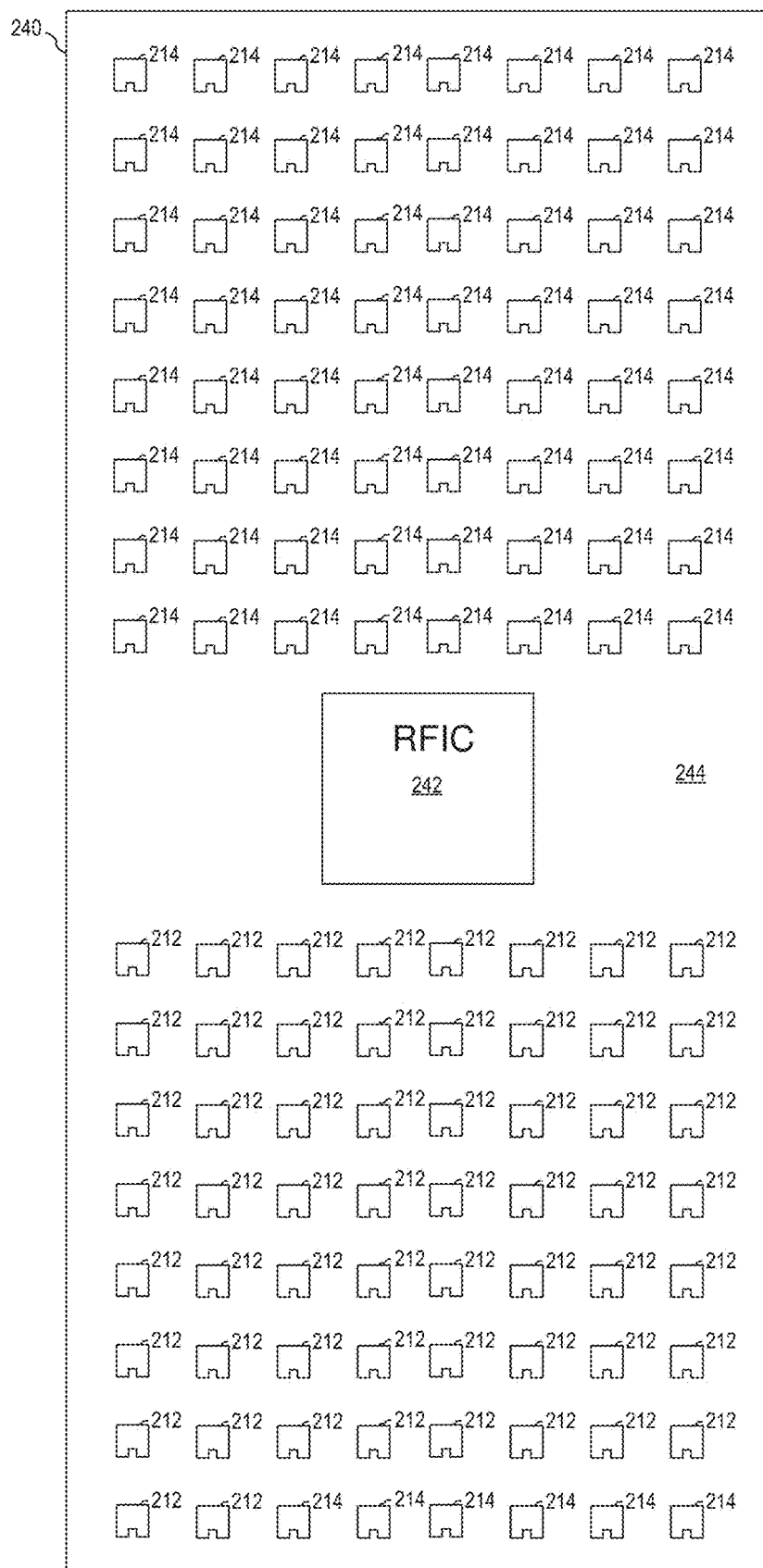

FIG. 2D illustrates a plan view of millimeter-wave radar sensor circuit 240 that includes an 8×8 array of transmit antennas 212 and an 8×8 array of receive antennas 214 coupled to RFIC 242 disposed on substrate 244. Each of the transmit antennas 212 is coupled to a corresponding pin on RFIC 242 and coupled to a corresponding transmit circuit within RFIC 242; and each of the receive antennas 214 is coupled to a corresponding pin on RFIC 234 and coupled to a corresponding receive circuit within RFIC 242. However, these connections between transmit antennas 212 and RFIC 242 and between receive antennas 214 and RFIC 242 are not shown in FIG. 2D for ease of illustration. In some embodiments, multiple radar sensors may be further arrayed in order to perform beam steering and measurements in multiple directions.

Figure 2E:
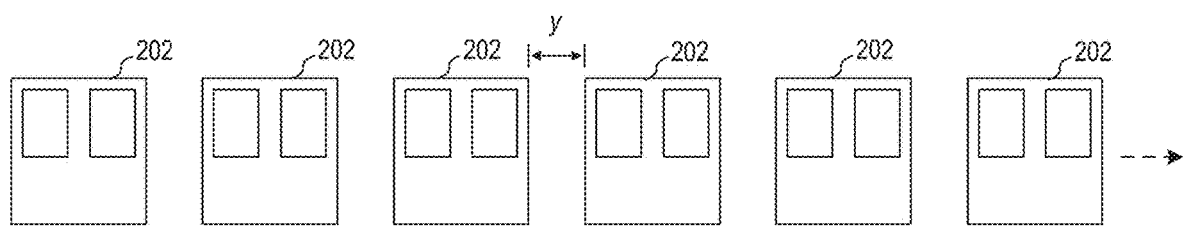
FIGS. 2E-2H illustrate various embodiment configurations for the placement of millimeter-wave radar sensors.

FIGS. 2E-2H illustrate various configurations for the placement of millimeter-wave radar sensors 202 and/or radar antennas. FIG. 2E illustrates millimeter-wave radar sensors 202 configured in a uniform linear array with a distance y between each sensor. While six millimeter-wave radar sensors 202 are shown in the illustration, it should be understood that greater or fewer than six millimeter-wave radar sensors 202 may be used depending on the specific embodiment and its specifications.

Figure 2F:
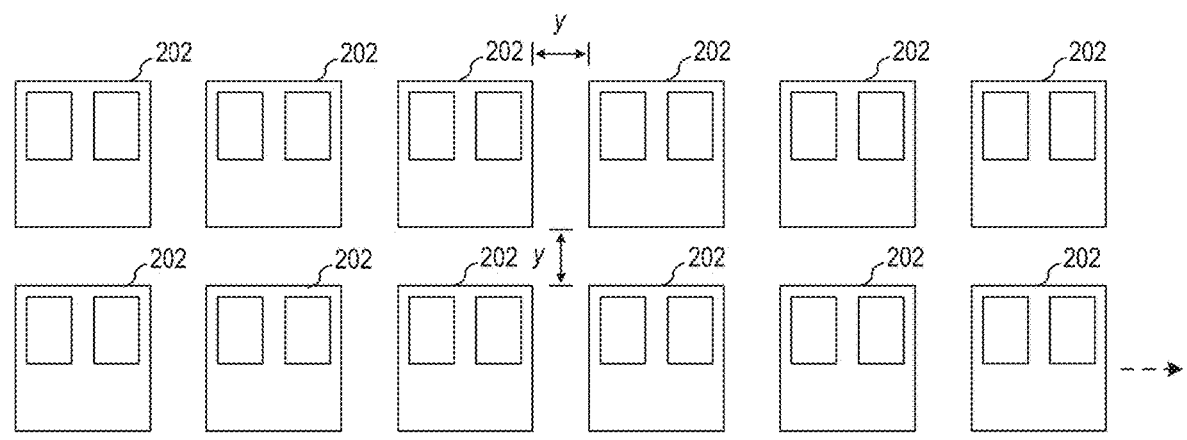
Figure 2G:
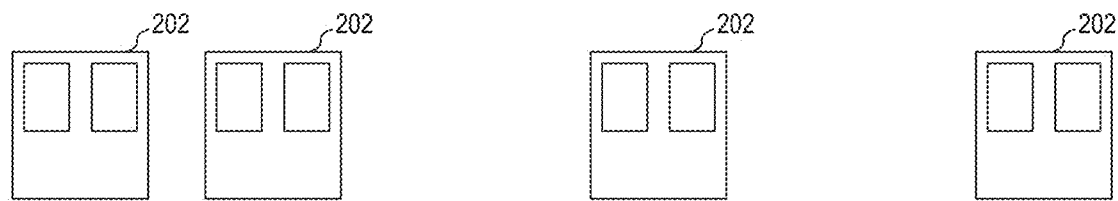

FIG. 2F illustrates millimeter-wave radar sensors 202 configured in a uniform rectangular array with a distance y between each sensor. While an array of 2×6 millimeter-wave radar sensors 202 are shown in the illustration, it should be understood that any rectangular array dimension may be used depending on the specific embodiment and its specifications. Configuring millimeter-wave radar sensors 202 in a rectangular configuration may help to improve cross-range resolution. In various embodiments, the range of the radar system is a distance between the sensor and the target, while the cross-range of the resolution pertains to a spatial resolution within a sensing place of radar sensors 202.

Millimeter-wave radar sensors 202 may also be implemented in a non-uniform configuration. For example, FIG.

Figure 2H:
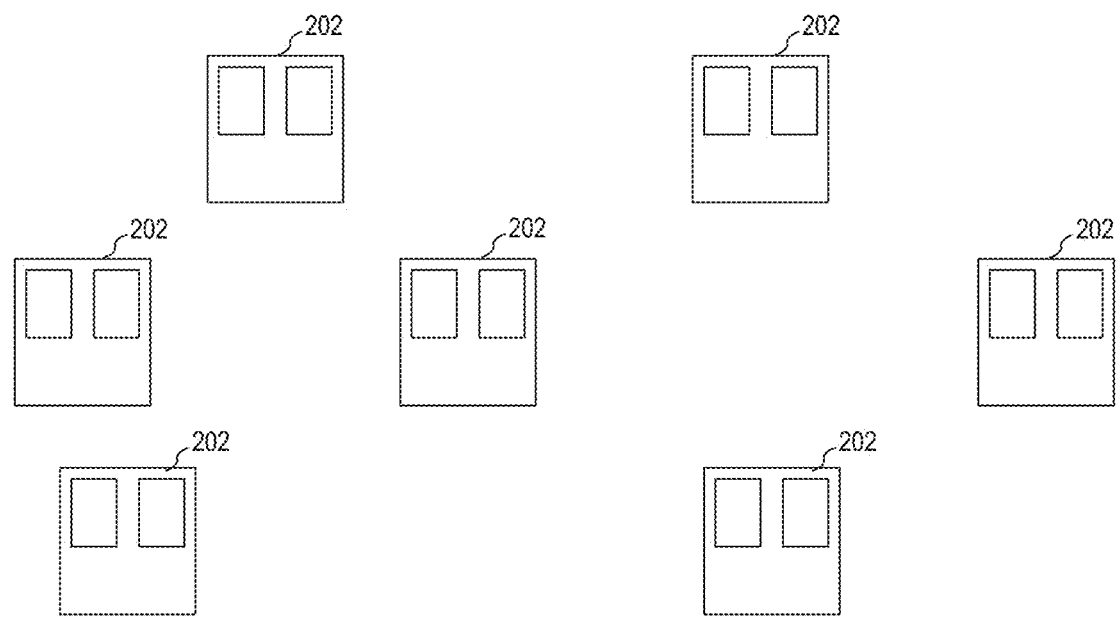

2G illustrates millimeter-wave radar sensors 202 configured in a non-uniform linear array, and FIG. 2H illustrates millimeter-wave radar sensors 202 configured in a non-uniform two-dimensional array.

In various embodiments, millimeter-wave radar sensors 202 have a minimum distance of between 0.5λ and 0.7λ between each other where λ is the wavelength of the millimeter-wave RF signal. This distance between millimeter-wave radar sensors 202 may be increased when the position of each sensor is known for processing extracted data.

In various embodiments, millimeter-wave radar sensors 202 may be mounted on a variety of surfaces and may be hidden under different materials and/or radome types that include, for example, polycarbonate, glass, plastics and other materials. In some embodiments, metals are not used above the sensor system. In other embodiments, a layer of metal may be used above the sensor plane as a shield or a waveguide depending on the particular system. For example, a Yagi antenna disposed on the substrate of millimeter-wave radar sensor 202 may be used to transmit or receive a signal in the same plane as the sensor. In such a case, the antenna may be rotated by 90 degrees such that the beam produced by the radar sensor is directed toward the target. A metal shield may be disposed above the antenna.

In some embodiments, millimeter-wave radar sensors 202 operate at a frequency range of 57 GHz to 64 GHz for 7 GHz bandwidth. However, different frequency ranges and bandwidths could be used, as the resolution of the system generally is proportional to the bandwidth. In some cases, the power levels transmitted by millimeter-wave radar sensors 202 may be limited to comply with government regulations, such as regulations promulgated by the United States Federal Communications Commission (FCC). In some embodiments, any uniform linear array (ULA), non-uniform linear array (NULA), uniform rectangular array (URA) or non-uniform rectangular array (NURA) may be used depending on resolution requirements, power consumption, system space available etc.

In one specific embodiment, the millimeter-wave radar system operates in the 60 GHz ISM band. During operation, the transmitted frequency varies 500 MHz between 61.0 and 61.5 GHz using a 2 ms chirp length. The transmitted power is 20 dBm, and both transmit and receive antennas are arranged in an 8×8 array to achieve an antenna gain of 20 dB. The range of the radar is 100 m and the radar cross section (RCS) is 2 $m^2$. The gain of the receiver is 20 dB, the receive noise figure is 10 dB, and a SNR of 10 dB is achieved at the IF. It should be appreciated that this is just one example of RF metrics for an embodiment system. The performance parameters of embodiment systems may vary depending on the specific system and its implementation.

Figure 3A:
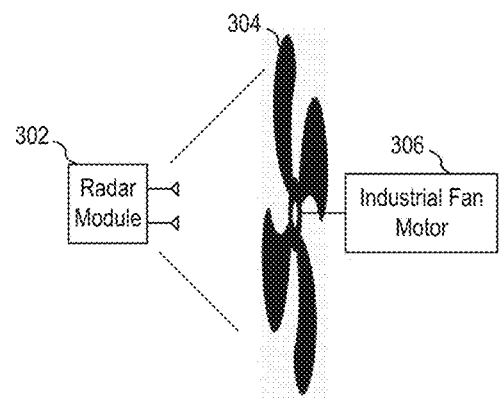
FIG. 3A-3F illustrate various use cases to which embodiment air flow/fan health monitoring systems can be applied.

FIGS. 3A-3F illustrate various example use cases to which embodiments of the present invention can be applied. It should be understood that the example use cases described in FIGS. 3A-3F are just a few non-limiting examples of environments and situations to which embodiment fan and air flow monitoring systems and methods may be applied. FIG. 3A illustrates a use case in which fan 304 driven by industrial fan motor 306 is monitored by radar module 302. Fan 304 may represent any fan including, but not limited to an industrial heat exchanger fans, industrial condenser fans and turbines. Radar module 302 may be configured to monitor foreign objects flying into fan 304 and/or monitor the structural integrity of fan 304 according to embodiments of the present invention.

Figure 3B:
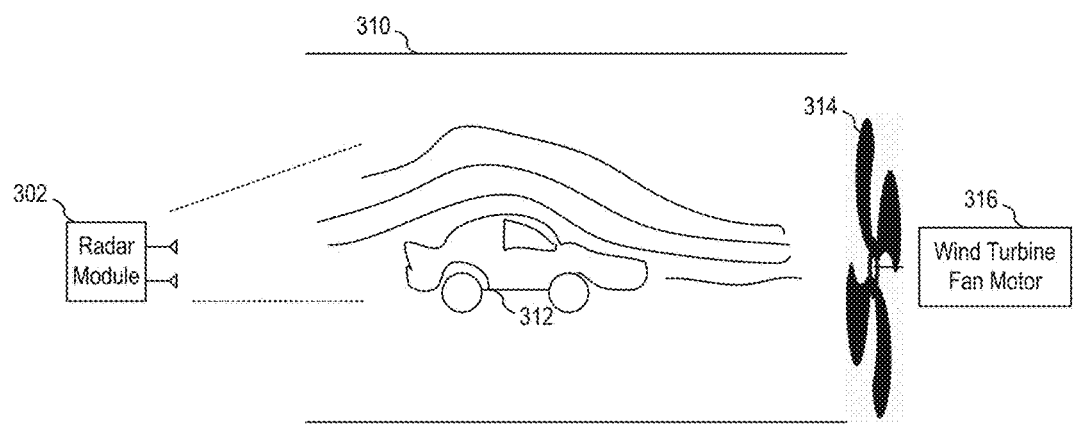

FIG. 3B illustrates a use case in which radar module 302 monitors a wind tunnel 310 in which a high velocity air flow is created by wind turbine fan 314 that is driven by wind turbine fan motor 316. Wind tunnel 310 may be used, for example, to assess the aerodynamic performance of car 312 or other object, such as an airplane or motorcycle. Radar module 302 may be configured to monitor foreign objects flying into wind turbine fan 314 and/or monitor the structural integrity of wind turbine fan 314 according to embodiments of the present invention.

Figure 3C:
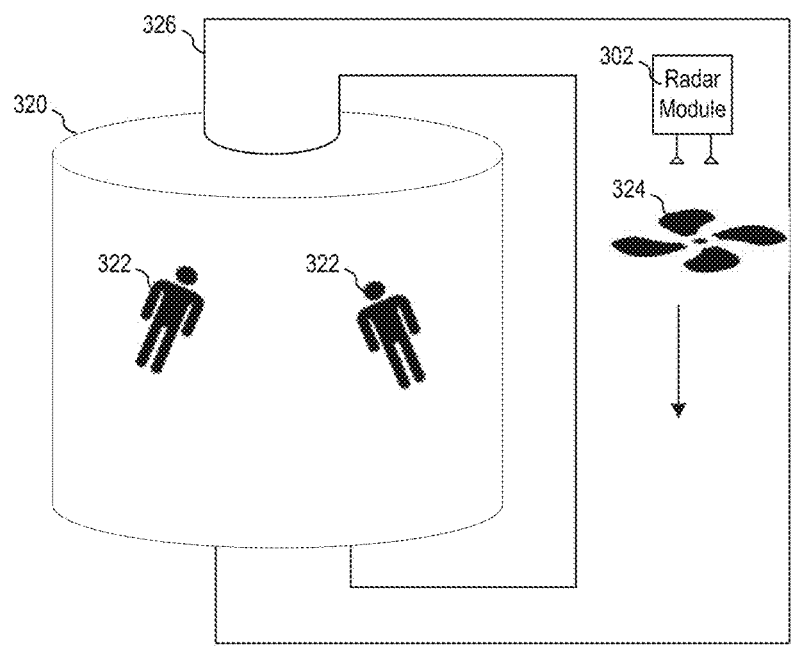

FIG. 3C illustrates a use case in which radar module 302 monitors an air duct 326 of an indoor flight chamber. As shown, the indoor flight chamber includes a tunnel section 320 and an air duct 326 connected to tunnel section 320. During operation, high-efficiency axial fan 324 disposed within air duct 326 generates an air flow of about 250 km/h, which provides sufficient lift to cause users 322 to float in tunnel section 320. Radar module 302 may be configured to monitor foreign objects flying into fan 324 and/or monitor the structural integrity of fan 324 according to embodiments of the present invention.

Figure 3D:
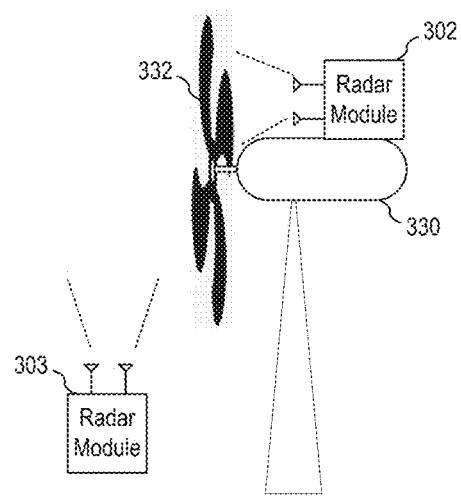

FIG. 3D illustrates a use case in which radar modules 302 and 303 monitor the operation of wind turbine 330 that includes rotor blade 332. Radar module 302 mounted on the body of the wind turbine may be configured to monitor the structural integrity of rotor blade 332, while radar module 303 having a line of sight perpendicular to the air flow of the wind turbine may be used to monitor foreign objects that might hit rotor blade 332.

Figure 3E:
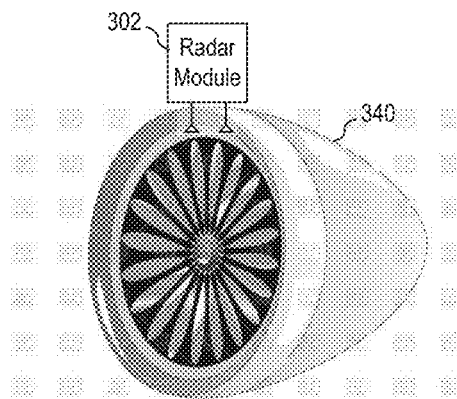
Figure 3F:
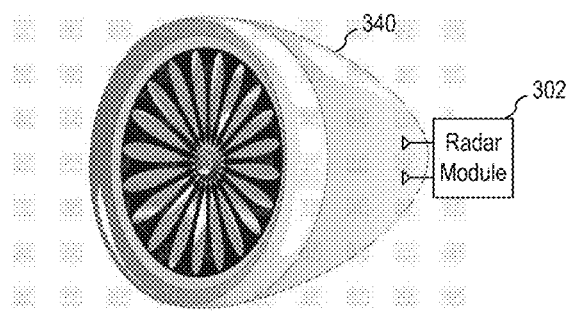

FIGS. 3E and 3F illustrate use cases in which the fan of a jet engine 340 is monitored by radar sensor 302. In FIG. 3E, radar sensor 302 is positioned to monitor the air flow that flows into the jet engine 340. In some embodiments, radar sensor 302 is implemented using a bar of millimeter radar array sensors that protrude from the body of the aircraft and hang above jet engine 340. In FIG. 3F, radar sensor 302 is positioned within jet engine 340 and may be configured to detect foreign objects that fall within jet engine 340. In some embodiments, radar sensor 302 continuously monitors the vibrational characteristics of jet engine 340 as well as the presence of foreign objects entering jet engine 340. Vibrational and foreign object data generated by radar sensor 302 may be used to alert flight and maintenance crews of the occurrence of foreign objects being detected as well as the overall health of jet engine 340.

Figure 4A:
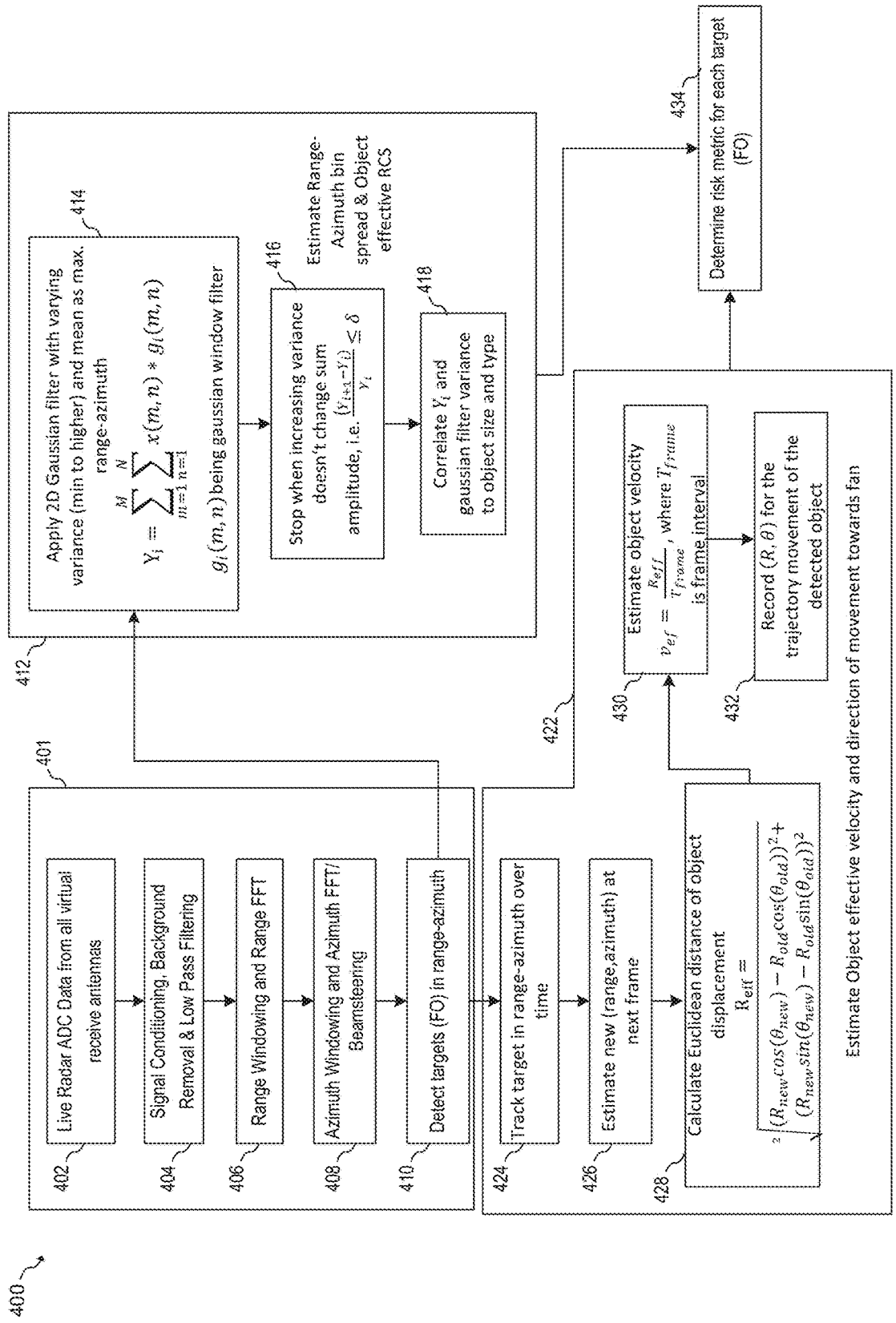
FIG. 4A illustrates block diagram of an embodiment method of detecting foreign objects.

FIG. 4A illustrates a block diagram of an embodiment method 400 of performing a millimeter-wave sensor based air flow analysis using a millimeter-wave radar sensor. This method can be used, for example, implement the radar signal processing for embodiments, such as those shown in FIG. 1A, in which the air flow is monitored by a millimeter-wave radar sensor having a line of sight perpendicular to the air flow. Radar processing occurs in basically three phases. In the first phase 401 that includes steps 402, 404, 408 and 410, radar data is collected from the millimeter-wave radar sensor and foreign objects 110 are detected. In the second phase 412, which includes steps 414, 416 and 418, the size and radar cross-section of each detected foreign object 110 is measured based on the received radar data. In the third phase 422, the velocity and trajectory of each detected foreign object is detected. Once the size, radar cross-section, velocity and trajectory of each foreign object 110 are determined, a risk metric is calculated for each foreign object 110 as explained below.

In the first phase 401, live radar data is collected from the millimeter wave radar sensor in step 402. In some embodiments, this radar data is collected form digitized baseband radar data and may include separate baseband radar data from multiple antennas. In some embodiments, these antennas may be "virtual antennas," which are generated by the convolution of transmit antenna placements and the receive antenna placements. For example, two transmit antennas and four receive antennas can be operated to provide the equivalent of eight receive channel. In one embodiment, the two transmit antennas are employed sequentially such that a pulse is sent on the first transmit antenna and the reflected signal is received on the four receive antennas. Next, a pulse is sent on the second transmit antenna and then received on the four receive antennas. Eight channels are virtually generated from the received data from the four receive antennas using virtual antenna techniques known in the art.

In step 404, signal conditioning, low pass filtering and background removal is performed. During step 404, radar data received during step 402 is filtered, DC components are removed, and IF data is cleared. In some embodiments, IF data is cleared by filtering to remove the Tx-Rx self-interference and optionally pre-filtering the interference colored noise. In some embodiments, filtering includes removing data outliers that have significantly different values from other neighboring range-gate measurements. This filtering also serves to remove background noise from the radar data. In a specific example, a Hampel filter is applied with a sliding window at each range-gate to remove such outliers. Alternatively, other filtering for range preprocessing known in the art may be used.

In step 406, a series of FFTs are calculated based on the radar data that has been conditioned in step 404. In some embodiments, a windowed FFT having a length of the chirp (e.g., 256 samples) may be calculated along each waveform for each of a predetermined number of chirps in a frame of data. Alternatively, other frame lengths may be used. The FFTs of each waveform or chirp may be referred to as a "range FFT." In alternative embodiments, other transform types could be used besides an FFT, such as a Discrete Fourier Transform (DFT) or a z-transform.

In step 408, an azimuth FFT is performed on range FFT data produced in step 406 using, for example, higher order beamforming and superresolution techniques known in the art. In various embodiments, the azimuth FFT provides an indication as to the angular location of the detected objects with respect to the position of the millimeter-wave radar sensor, which can effectively implement beam steering in some embodiments. In alternative embodiments, other transform types could be used besides an FFT for the range and azimuth FFTs of steps 406 and 408, such as a Discrete Fourier Transform (DFT) or other transform types such as a z-transform.

In step 410, the range and azimuth FFTs derived in step 408 are analyzed to determine the presence of foreign objects 110. These objects may be detected, for example, by analyzing which range-gates of the range and azimuth FFTs have high amplitudes. For example, range-gates whose mean is greater than the mean of all the other range gates in its field of view are selected as potential target range-gates that correspond to detected foreign objects 110. In some embodiments, the range bins whose magnitude exceeds a dynamic threshold set by a constant false alarm rate (CFAR)) detector are selected as potential targets.

During phase two 412, the size and radar cross section is determined for each foreign object detected in step 410. In step 414, the size of each foreign object is detected by successively applying two-dimensional Gaussian filters of various sizes to the range and azimuth FFTs determined in steps 406 and 408 as follows:

$$Y_i = \Sigma_{m=1}^{M} \Sigma_{n=1}^{N} x(m, n) * g_i(m, n),$$

where $Y_i$ is the Gaussian filtered output value, m represents the number of range bins, n represents, the number of azimuth bins and $g_i(m, n)$ represents the Gaussian window filter. In some embodiments, the dimensions of the Gaussian filter are successively increased until the the Gaussian filtered output value $Y_i$ ceases to increase beyond a predetermined amount in step 416 such that:

$$\frac{(Y_{i+1} - Y_i)}{Y_i} \leq \delta,$$

where δ is a predetermined threshold. In some embodiments, the dimensions of the increasing Gaussian filter dimensions are 3×3, 4×4, 5×5, 6×6 and 7×7. Alternatively other dimensions may be used. It should also be understood that other two-dimensional filter types may be used in alternative embodiments of the present invention.

In various embodiments, Gaussian filtered output value $Y_i$ can be used as a metric corresponding to the radar cross section of the detected foreign object 110, while the final dimension of the Gaussian filter or Gaussian filter variance can be used as a metric corresponding to the size of the detected foreign object 110. Thus, in some embodiments, the determined values for $Y_i$ and the Gaussian filter variance are correlated with a size and type of foreign object. This correlation may be performed, for example, using a two-dimensional convolution operation. In some cases, the variance of the Gaussian filter is chosen to match the size and type of foreign object. These variances are pre-selected and fixed based on the objects that are expected to be encountered. In some embodiments, correlation step 418 may be omitted and the risk metric determined in step 434 may be determined based on the determined values for $Y_i$ and the Gaussian filter variance directly.

In phase three 422, the velocity and trajectory of the foreign objects 110 detected in step 410 are determined. In step 424, each detected target foreign object 110 is tracked in the range and azimuth directions over time. In some embodiments, tracking these objects involves recording the range and azimuth measurements over temporal time for each received radar chirp. Next, in step 426, a new position of the detected object is estimated in the range and azimuth dimensions. The new position of all relevant objects are estimated on the next frame and a target data association step is applied to assign old detected targets to the new estimates based on nearest neighbor Euclidean distance.

Based on the tracked and estimated target data derived in steps 424 and 426, the Euclidean distance of the tracked object displacement is calculated in step 428 as follows:

$$R_{\mathit{eff}} = \sqrt[2]{(R_{new}\cos(\theta_{new}) - R_{old}\cos(\theta_{old}))^2 + (R_{new}\sin(\theta_{new}) - R_{old}\sin(\theta_{old}))^2}$$

where $R_{\mathit{eff}}$ is the estimated displacement of the detected object, $R_{new}$ is the present range of the detected object, $\theta_{new}$ is the present azimuth of the detected object, $R_{old}$ is the previous range of the detected object, and $\theta_{old}$ is the previous azimuth of the detected object. In some embodiments, $\theta_{new}$ and $\theta_{old}$ are estimated using data from the azimuth FFT performed in step 408.

In step 430, the velocity of the detected object is estimated as follows:

$$v_{eff} = \frac{R_{eff}}{T_{frame}},$$

where $v_{eff}$ is the estimated velocity of the detected object, $R_{eff}$ is the estimated displacement of the object, and $T_{frame}$ is the frame interval. Next in step 432, the displacement and angle of displacement for the trajectory movement of the detected object is recorded over time. In various embodiments, the rate of angle change changed in one direction. This rate of angle change may, for example, indicate the velocity of the object hitting the fan. The change of range R, on the other hand, indicated the angle of incidence of the detected object at the point of physical impact. In some situations, objects hitting the fan perpendicularly may have higher damaging impact than object that hit the fan at other angles.

In step 434, a risk metric is determined based on the size and radar cross-section of the detected foreign object 110 determined during the second phase 412 of calculations, and based on the velocity and trajectory of the detected foreign object 110 determined during the third phase 422 of calculations. In embodiment, the risk metric is determined based on the categories and classifiers shown in the table in FIG. 4B. In one particular embodiment, the estimated weight of the detected object is classified into two categories (heavy and light) based on the Gaussian filter dimension or variance determined in step 416. The estimated velocity of the detected object is classified into two categories (high velocity and low velocity) based on the velocity estimated in step 430; the estimated angle of incidence of the detected object is classified into two categories (direct incidence and indirect incidence) based on the velocity estimated in step 430; and the radar cross section of the detected object is classified into three categories (high, mid and low) based on the amplitude $Y_i$ of the Gaussian filtered range and azimuth FFTs determined in step 414. In some embodiments, angle of incidence is computed by calculating the angle of incidence as $\theta_{incidence} = \theta_{new} - \theta_{old}$, and averaging the calculated angle of incidence over several estimates. During operation, each detected foreign object is assigned a classifier from each category and a risk metric is assigned to each foreign object based on its assigned classifiers. In some embodiments, this risk metric may be calculated, for example, based on a weighted sum of each classifier, or may be calculated using a lookup table that assigns a specific risk metric to each possible combination of classifiers. This risk metric may be ranked according to the particular risk that a detected object will damage the fan. For example, lighter objects carry a lower risk than a heavy objects and lower velocity object carry a lower risk than higher velocity objects. With respect to angle of incidence, a heavy object with an indirect incidence may have a lower risk than a light object with a high radar cross-section, high velocity and direct incidence. In some embodiments, the risk factor of each detected object and a threat/impact report is generated as the objects are detected. This threat/impact report may be made available to personnel responsible for maintaining the system. In alternative embodiments, each category may have a different number of classifiers and/or a different set of classifiers. Moreover, in some embodiments, a different set of categories may be used to classify each detected foreign object 110. In some embodiments, the incidence history is also transmitted to the maintenance team for evaluation in addition to the determined risk level. As such, the maintenance team can make an independent decision as to whether or not to perform maintenance activities based on the determined risk level and the incident history.

Figure 5A:
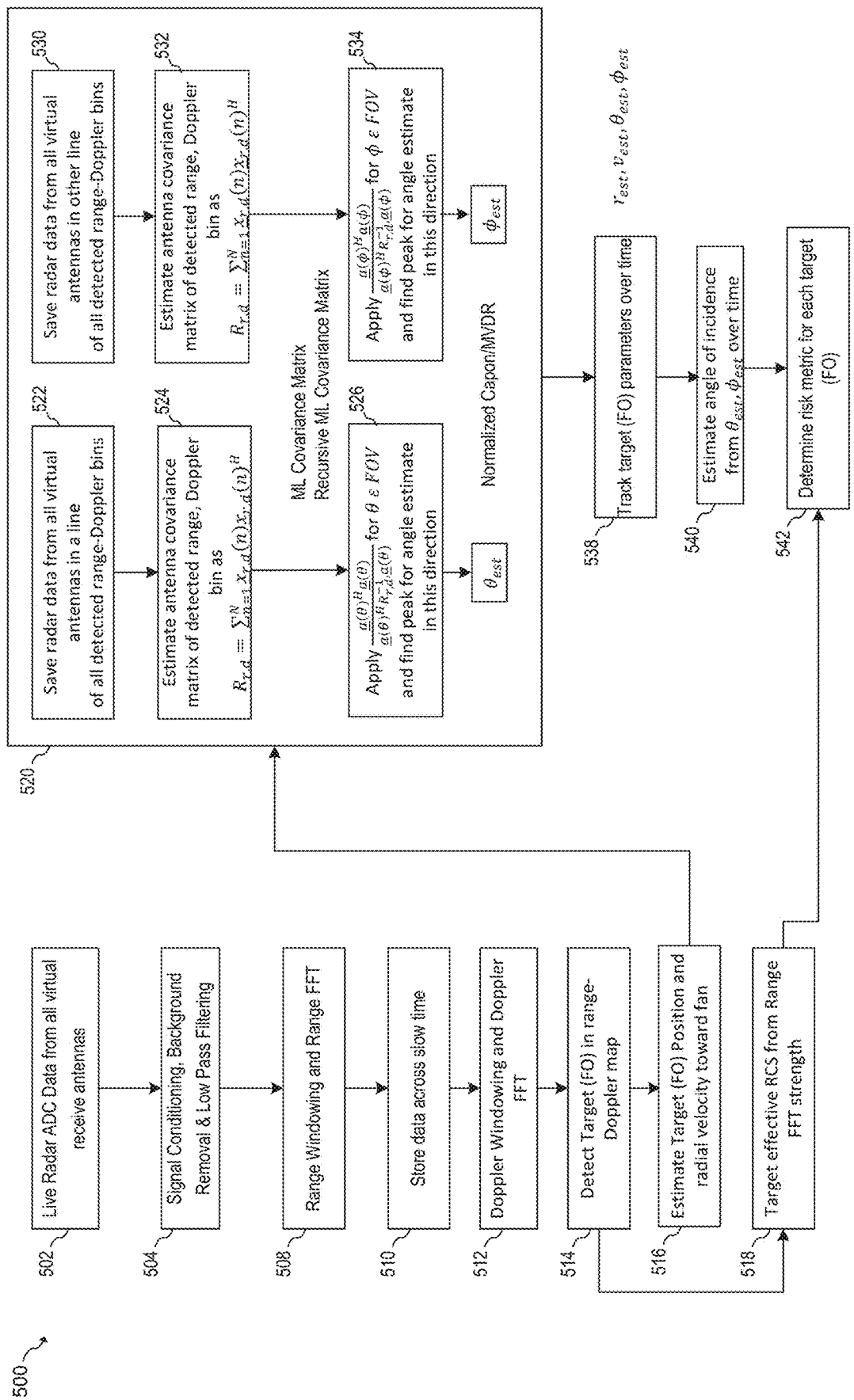
FIG. 5A illustrates block diagram of a further embodiment method of detecting foreign objects.

FIG. 5A illustrates a block diagram of an embodiment method 500 of performing a millimeter-wave sensor based air flow analysis using a millimeter-wave radar sensor. This method can be used, for example, implement the radar signal processing for embodiments, such as those shown in FIG. 1B, in which the air flow is monitored by a millimeter-wave radar sensor having a line of sight collinear to the air flow. Radar processing occurs as follows. In steps 502, 504, 508, 510, 512, 514, and 516 radar data is collected from the millimeter-wave radar sensor and foreign objects 110 are detected with respect to position and radial velocity. In steps 520, 538 and 540 a three-dimensional trajectory of the detected foreign object 110 is determined, in part, using a Capon/MVDR analysis, and in step 518, a radar cross-section of each detected foreign object 110 is determined. A risk metric is derived in step 542 based on the determined trajectory and radar cross-section.

In step 502, live radar data is collected from the millimeter wave radar sensor. In some embodiments, this radar data is collected form digitized baseband radar data and may include separate baseband radar data from multiple antennas. In some embodiments, these antennas may be "virtual antennas" as explained above.

In step 504, signal conditioning, low pass filtering and background removal is performed. During step 504, radar data received during step 502 is filtered, DC components are removed, and IF data is cleared. In some embodiments, IF data is cleared by filtering to remove the Tx-Rx self-interference and optionally pre-filtering the interference colored noise. In some embodiments, filtering includes removing data outliers that have significantly different values from other neighboring range-gate measurements. Thus, this filtering also serves to remove background noise from the radar data. In a specific example, a Hampel filter is applied with a sliding window at each range-gate to remove such outliers. Alternatively, other filtering for range preprocessing known in the art may be used.

In step 508, a series of FFTs are calculated based on the radar data that has been conditioned in step 504. In some embodiments, a windowed FFT having a length of the chirp (e.g., 256 samples) may be calculated along each waveform for each of a predetermined number of chirps in a frame of data. Alternatively, other frame lengths may be used. The FFTs of each waveform or chirp may be referred to as a "range FFT." In alternative embodiments, other transform types could be used besides an FFT, such as a Discrete Fourier Transform (DFT) or a z-transform. In step 510, the results of each range FFT are stored in slow time.

In step 512, a Doppler FFT is derived based on a series of range FFTs collected in slow time. In some embodiments calculated the Doppler FFT entails calculating a windowed two-dimensional FFT of the range FFT over slow-time to determine the velocity of each detected foreign object 110.

In step 514, the Doppler FFT derived in step 512 is analyzed to determine the presence of foreign objects 110. These objects may be detected, for example, by analyzing which range-gates of the Doppler FFTs has high amplitudes. For example, range-gates whose mean is greater than the mean of all the other range gates in its field of view are selected as potential target range-gates that correspond to detected foreign objects 110. In some embodiments, range-gates having a magnitude higher than a dynamic CFAR threshold or fixed threshold are selected.

In step 514, the position and radial velocity of each detected foreign object 110 is determined, for example, by fixed two-dimensional thresholding. In step 518, the radar cross-section of each detected object is determined based on the amplitude of the FFT bins that correspond to the detected foreign object 110.

In various embodiments, a beam is formed at the transmitter by post processing a plurality of baseband signals based on a plurality of signals received by different receivers or a combination thereof. Implementing beamforming by post processing received baseband signals may allow for the implementation of a low complexity transmitter.

In one example, a millimeter-wave sensor system is used with $N_t=2$ transmit (TX) elements and $N_r=2$ receive (RX) elements arranged in a linear array. Accordingly, there are $N_t \times N_r = 4$ distinct propagation channels from the TX array to the RX array in a linear array configuration for azimuth angle profiling. If the transmitting source (TX channel) of the received signals can be identified at the RX array, a virtual phased array of $N_t \times N_r$ elements can be synthesized with $N_t + N_r$ antenna elements. In various embodiments, a time division multiplexed MIMO array provides a low cost solution to a fully populated antenna aperture capable of near field imaging. In some embodiments, a symmetrical linear arrangement of the TX and the RX elements with some vertical offset between the TX array and the RX array for reduced coupling may be used.

Figures 5B, 5C:
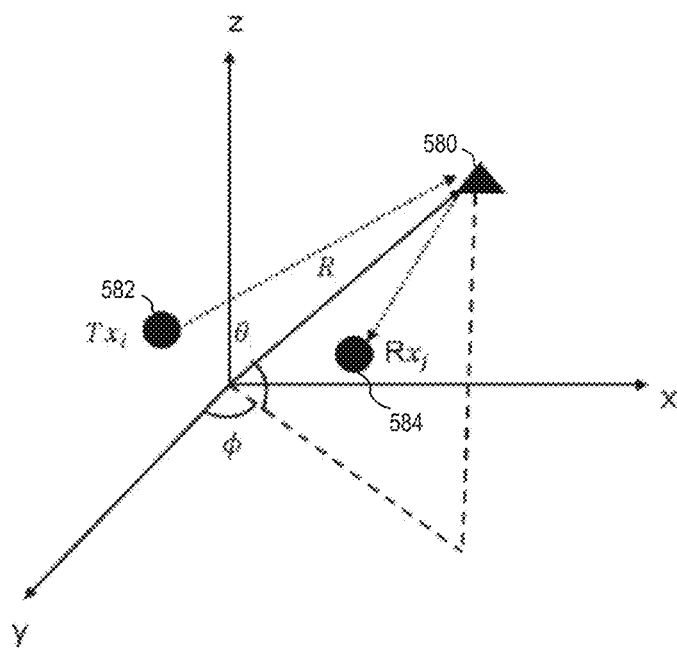
FIG. 5B illustrates a table representing a further embodiment classification foreign object classification scheme.
FIG. 5C shows a coordinate axes used to illustrate an embodiment algorithm.

FIG. 5C shows a coordinate axes used to illustrate an embodiment algorithm. As shown FIG. 5C illustrates the position of target 580, transmit (TX) antenna element 582 and receive (RX) antenna element 584. The position r of target 580 can be represented as $$r = [R\cos(\theta)\sin(\phi);\ R\cos(\theta)\cos(\phi);\ R\sin(\theta)],$$

where R is the distance from the origin to target 580. The directional vector u of target 580 can be expressed as $$u = [\cos(\theta)\sin(\phi);\ \cos(\theta)\cos(\phi);\ \sin(\theta)].$$

Denoting the 3D positional coordinates of the TX antenna element as $d_i^{Tx}$, i=1, 2 and the RX antenna element as $d_j^{Rx}$, j=1, 2 in space, then on assuming far field conditions, the signal propagation from a TX element $d_i^{Tx}$ to target 580 (assumed to be a point scatterer) and subsequently the reflection from target 580 to Rx antenna element $d_j^{Rx}$ can be approximated as $2 \ast x + d_{ij}$, where x is the based distance of target 580 to the center of the virtual linear array, and $d_{ij}$ refers to the position of the virtual element to the center of the array.

The transmit steering vector may be written as:

$$a_i^{Tx}(\theta,\phi) = \exp\left(-j2\pi \frac{d_i^{Tx} u(\theta,\phi)}{\lambda}\right);\ i=1,2,$$

and the receiving steering vector may be expressed as:

$$a_j^{Rx}(\theta,\phi) = \exp\left(-j2\pi \frac{d_j^{Rx} u(\theta,\phi)}{\lambda}\right);\ j=1,2,$$

where $\lambda$ is the wavelength of the transmit signal. A joint TX and RX steering vector $a(\theta,\phi)$ can be derived as the Kronecker of the transmit and receive steering vectors (assuming i=j=1):

$$a(\theta,\phi) = a_i^{Tx}(\theta,\phi) \otimes a_j^{Rx}(\theta,\phi);\ i=j=1.$$

From the joint steering vector, the following beamspace spectrum may be computed from which angles $\theta$ and $\phi$ may be estimated according to a minimum variance distortionless response (MVDR) algorithm:

$$P(\theta,\phi) = \frac{a(\theta,\phi)^H a(\theta,\phi)}{a(\theta,\phi)^H C a(\theta,\phi)},$$

In the above expression, $C = E\{x(r,d)x(r,d)^H\}$ is calculated as a covariance matrix, where $E\{.\}$ is the expectation operator. The above covariance matrix may be estimated as sample matrix indicator as $$C = \frac{1}{N} \sum_{n=1}^{N} x_i(r,d) x_i(r,d)^H,$$

where $x_i(r, d)$ represents measured range, Doppler data (r, d).

In some embodiments, however, angles $\theta$ and $\phi$ may be estimated separately as shown with respect to step 520 in FIG. 5A. As shown, in step 520 includes steps 522, 524, 526, 530, 532 and 534, the trajectory of each foreign object is determined based on data derived in steps 502, 504, 508, 510, 512, 51.4 and 516. In particular, steps 522, 524, 526 estimate polar angle $\theta_{est}$, and steps 530, 532 and 534 are used to estimate azimuthal angle $\phi_{est}$. In various embodiments, a MVDR algorithm is applied as follows.

In step 522 data is saved from all virtual antennas in a line of detected range-Doppler bins. In step 524, the antenna covariance matrix of the detected range-Doppler bins is estimated as follows:

$$R_{r,d} = \sum_{n=1}^{N} \underline{x}_{r,d}(n) \underline{x}_{r,d}(n)^H,$$

where $R_{r,d}$ is antenna covariance matrix, $\underline{x}_{r,d}(n)$ represents the data over a particular (range, Doppler)=(r,d) and n represents the specific (r,d) data across multiple frames (n being the indices, and N is the number of frames considered). In step 526, a MVDR algorithm is applied to the range and Doppler data as follows using the above derived covariance matrix:

$$P(\theta) = \frac{\underline{a}(\theta)^H \underline{a}(\theta)}{\underline{a}(\theta)^H R_{r,d}^{-1} \underline{a}(\theta)},$$

where $P(\theta)$ represents azimuth spatial spectrum, and $\underline{a}(\theta)$ is the virtual antenna steering vector along the azimuth angle for test angle $\theta$ within the field of view. In an embodiment, the value $\theta$ is found that provides a peak value for $P(\theta)$. This determined value for $\theta$ is the estimated polar angle $\theta_{est}$ of the detected foreign object.

The estimated azimuthal angle $\phi_{est}$ is found in a similar manner as the estimated polar angle $\theta_{est}$ as follows. In step 530 data is saved from all virtual antennas in the other line (e.g., with respect to the elevation angle) of detected range-Doppler bins. In step 532, the antenna covariance matrix of the detected range-Doppler bins is estimated as follows:

$$R_{r,d} = \sum_{n=1}^{N} \underline{x}_{r,d}(n) \underline{x}_{r,d}(n)^H,$$

where $R_{r,d}$ is antenna covariance matrix. In step 526, an MVDR algorithm is applied to the range and Doppler data as follows using the above derived covariance matrix:

$$P(\phi) = \frac{a(\phi)^H a(\phi)}{a(\phi)^H R_{r,d}^{-1} a(\phi)},$$

where P(φ) represents spatial elevation angle spectrum, and a(φ) is the virtual antenna steering vector along the azimuth angle for test angle φ within the field of view. In an embodiment, the value φ is found that provides a peak value for P(φ). This determined value for φ is the azimuthal angle $\phi_{est}$ of the detected foreign object 110.

In step 538, spherical coordinates $\theta_{est}$, $\phi_{est}$ derived in step 520 and measured range and velocity $r_{est}$, $v_{est}$ determined in step 516 are tracked over time. In some embodiments these coordinates are tracked by logging their values over slow time. In step 540, the angle of incidence of detected foreign object 110 is calculated from coordinates $\theta_{est}$, $\phi_{est}$ by according to ($\theta_{est}$(new), $\phi_{est}$(new))−($\theta_{est}$(old), $\phi_{est}$(old)) and the mean of the estimate.

In step 542, a risk metric is determined based on the radial velocity of the detected foreign object 110 determined in step 516, the angle of incidence determined in step 540 and the radar cross-section determined in step 518. In embodiment, the risk metric is determined based on the categories and classifiers shown in the table in FIG. 5B. In one particular embodiment, the estimated radial velocity of the detected foreign object 110 is classified into two categories (high velocity and low velocity), the angle of incidence is classified into two categories (direct incidence and indirect incidence) and the radar cross section of the detected object is classified into three categories (high, mid and low). During operation, each detected foreign object 110 is assigned a classifier from each category and a risk metric is assigned to each foreign object based on its assigned classifiers. In some embodiments, this risk metric may be calculated, for example, based on a weighted sum of each classifier, or may be calculated using a lookup table that assigns a specific risk metric to each possible combination of classifiers. This risk metric may be ranked according to the particular risk that a detected object will damage the fan. It should be understood that the classifiers and categories shown in FIG. 5B is just one example of many possible embodiment classification schemes. In alternative embodiments, each category may have a different number of classifiers and/or a different set of classifiers. Moreover, in some embodiments, a different set of categories may be used to classify each detected foreign object 110.

As mentioned above, in some embodiments, a radar having a line of sight that is collinear with the air flow and/or facing a fan, such as the system illustrated in FIG. 1B, may also be used to determine the structural health of the fan while it is rotating. FIGS. 6A-6D illustrate a block diagrams and descriptive diagrams of an embodiment method of performing a micro-Doppler analysis of a fan or other rotating object using a millimeter-wave radar sensor. In various embodiments, range-Doppler images from two separate radar antennas are combined to form a combine range-Doppler inverse synthetic-aperture radar (ISAR) image. A micro-Doppler signature of the fan is extracted from the ISAR image in order to characterize vibrational characteristics of the fan or rotating object being monitored. In some embodiments, the micro-Doppler signature may indicate the overall structural health of the fan or rotating object being monitored.

Figure 6A:
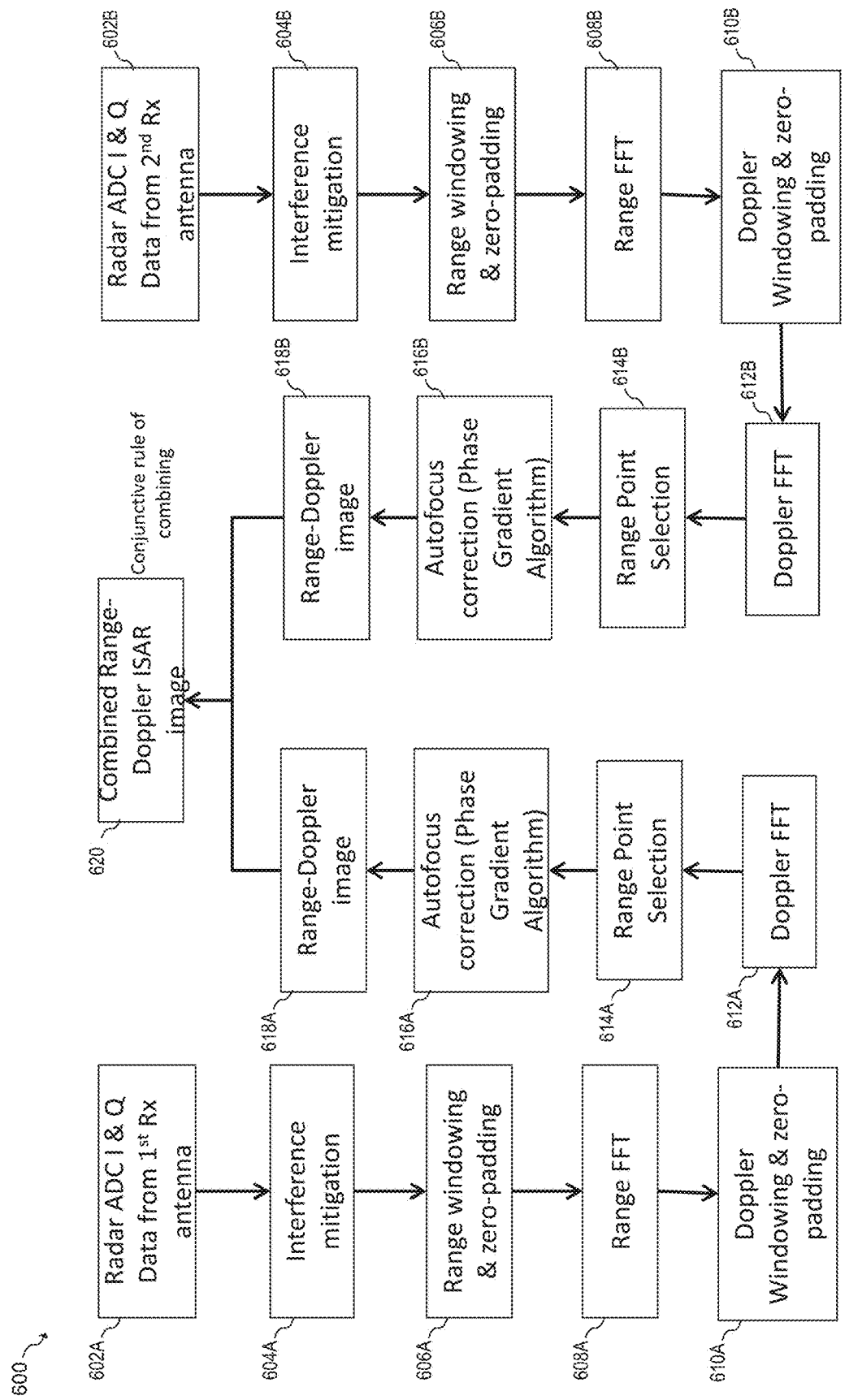
FIG. 6A illustrates a block diagram of an embodiment method of generating a combined range-Doppler ISAR image to analyze the structural health of a fan or rotating object.

FIG. 6A illustrates a method of producing the combined Doppler ISAR image from data produced from two millimeter-wave radar transceivers. In step 602A, data from a first antenna is received by the system. This radar data can be in the form of digitized in-phase (I) and quadrature (Q) data. In step 604A, interference mitigation is performed on the received digitized radar data. This may include, for example, pre-whitening the received radar sensor data for mitigating antenna correlation and colored clutter response. In step 606A range windowing and zero padding is performed in preparation for the range FFT for the radar data. In this step, a window function is applied to the received radar data followed by zero-padding to improve accuracy along range axis. In step 608A, a range FFT is performed on the windowed and zero-padded range data.

In step 610A Doppler windowing and zero padding is performed in preparation for the Doppler FFT of the range FFT data. A Doppler FFT is performed on the Doppler windowed and zero padded range FFT data in step 612A. In step 614A, maximum range gates are determined by evaluating the amplitude of each FFT bin produced by the Doppler FFT of step 612A and determining the maximum FFT bin(s) for each chirp. These high amplitude FFT bins correspond to detected foreign objects 110. In step 616A, autofocus correction is applied to the Doppler FFT image based on the determined maximum value FFT bins. In some embodiments a phase gradient algorithm may be used to implement the autofocus correction as is further explained below with respect to FIG. 6E. In step 618A, a range Doppler image is generated.

In step 602B, data from a second antenna different from the first antenna is received by the system. Steps 604B, 606B, 608B, 610B, 612B, 614B, 616B and 618B, which correspond to steps 604A, 606A, 608A, 610A, 612A, 614A, 616A and 618A described above are performed on the second antenna radar data received in step 602B. In step 620 a combines range-Doppler ISAR image is generated from the range-Doppler images created in steps 618A and 618B from the first antenna and the second antenna. In some embodiments, this combined range-Doppler ISAR image is generated using a conjunctive rule of combining. For example, a weighting function is determined by a respective signal to noise ratio (SNR) of the two antenna images, and then a weighted average is calculated based on the determined weights. The weighted average image could be calculated as follows:

Image$_{final}$=SNR$_1$*Image$_1$+SNR$_2$*Image$_2$, where Image$_{final}$ is the combined range-Doppler ISAR image, Image$_1$ is the range-Doppler image produced by step 618A, Image$_2$ is the range-Doppler image produced by step 618B, SNR$_1$ is the SNR associated with Image$_1$ and SNR$_2$ is the SNR associated with Image$_2$.

Figure 6B:
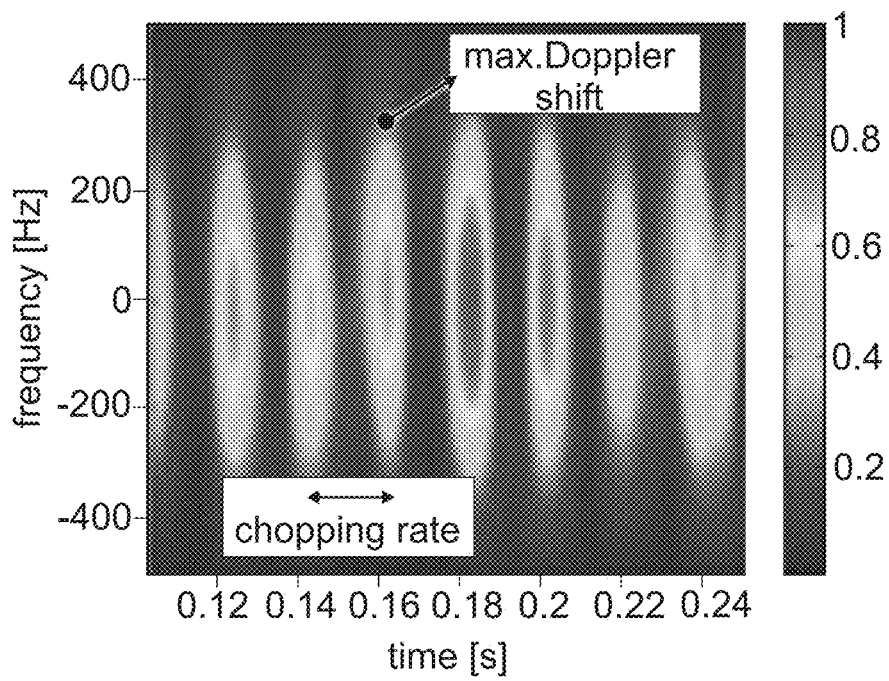
FIGS. 6B and 6C show plots of different aspects of an embodiment combined range-Doppler ISAR images.

FIG. 6B illustrates a combined range-Doppler ISAR image. As shown, the vertical bands of the combined range-Doppler ISAR image represent the periodic motion of the turning of the fan being monitored. The height of each vertical band represents the Doppler spread of the fan and its associated vibration characteristics.

Figure 6C:
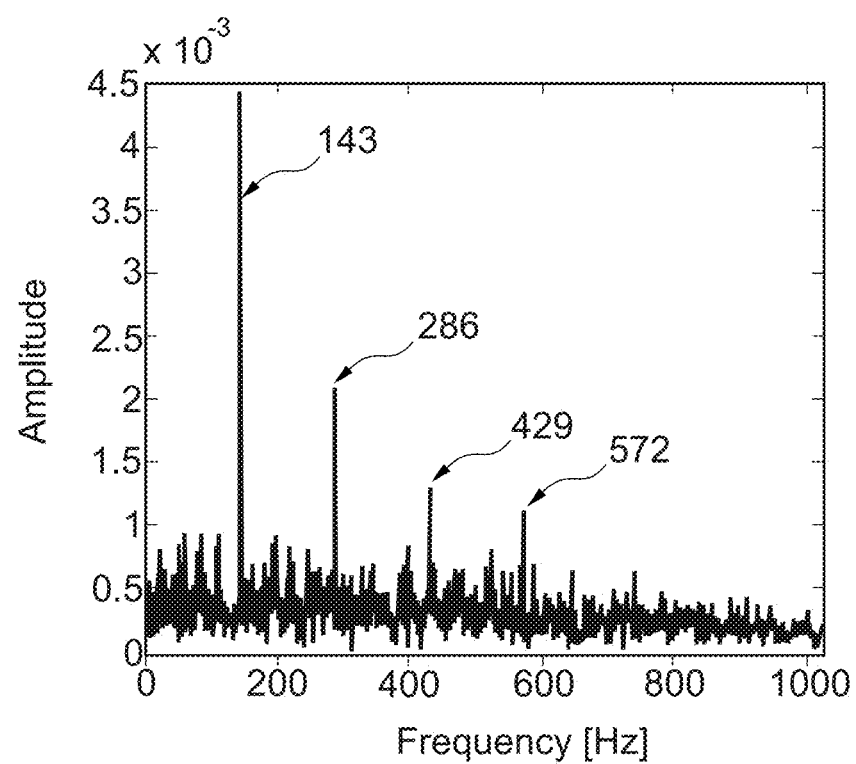

FIG. 6C illustrates a graph of an FFT that represents a vertical slice of the ISAR image of FIG. 6B. The fundamental tone at 150 Hz represents the frequency of rotation of the fan being monitored, while the remaining tones represent harmonics of the rotating fan. In some embodiments, the structure of these harmonics is correlated to the structural heath of the fan being monitored.

Figure 6D:
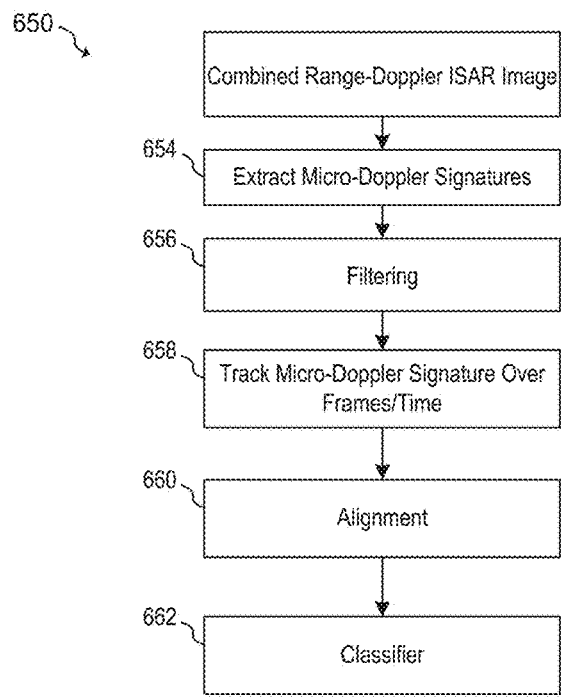
FIG. 6D illustrates a block diagram of a method of analyzing a combined range-Doppler ISAR image to determine the structural health of the fan or rotating object.

FIG. 6D illustrates an embodiment method 650 of classifying and assessing fan operating characteristics based on a combined range-Doppler ISAR image generated according to method 600 shown in FIG. 6A. In step 654, micro- Doppler signatures are extracted from the combined range-Doppler ISAR image. In some embodiments, micro-Doppler signatures are extracted through thresholding detection (for e.g. 16 significant micro-Doppler components are selected) and are tracked over multiple frames and stacked one (micro-Doppler) vector along other creating a 2D matrix/image. The micro-Doppler signature is fed into the classifier, such as support vector machine (SVM), Random Forest, or other classifier for classification. In some embodiments, the extracted micro-Doppler signature is in the form of tracked vibrational harmonics as illustrated in FIG. 6C. Accordingly, the structural integrity is reflected in the vibrating characteristics of the fan which, in turn, is reflected by the ISAR image or the micro-Doppler components, and is used by the machine learning classifier to interpret the integrity numerically.

The classifier output can be used as an automated closed-loop to find optimal fan blade settings. Next, in step 656, the extracted micro-Doppler signatures are filtered, for example, using thresholding. In some embodiments, a separate threshold is used for micro-Doppler and macro-Doppler signatures.

In step 658, the extracted micro-Doppler signatures are tracked over time, and in step 660, the extracted micro-Doppler signatures are aligned over multiple frames and/or slow time. In an embodiment, a Doppler FFT along a range bin associated with a detected object is taken, and the significant micro-Doppler components are selected again through thresholding. Over temporal time or frames, range detection is again performed and in this case a different range bin could contain the maximum response. The micro-Doppler components are then selected from this range bin and stacked beside the micro-Doppler vector from the earlier frame. Similarly this process is repeated for n frames creating a n×n micro-Doppler image, where n rows represent the n most significant micro-Doppler components and n columns represent the frame considered. In one embodiment, n=16. Alternatively, other values of n can be used depending on the specific embodiments and its specifications. Thus, the effect of variations in the fan operating settings can be analyzed over time.

In step 662, the performance of the micro-Doppler signatures over time is analyzed and classified in order to come up with a performance metric. In some embodiments, the tracked micro-Doppler signatures are loaded into vectors and a machine learning algorithm is applied to the vectors as is described below. Example metrics may include, for example, a "fan vibration safe," a "fan vibration optimal," and "fan vibration un-safe." Alternatively, other metrics can be used. The status of the fan using these metrics can be periodically communicated to maintenance personnel responsible for the maintenance of the fan equipment. In some embodiments, an alarm or other high priority or urgent communication may be initialed when an un-safe condition is detected.

Figure 6E:
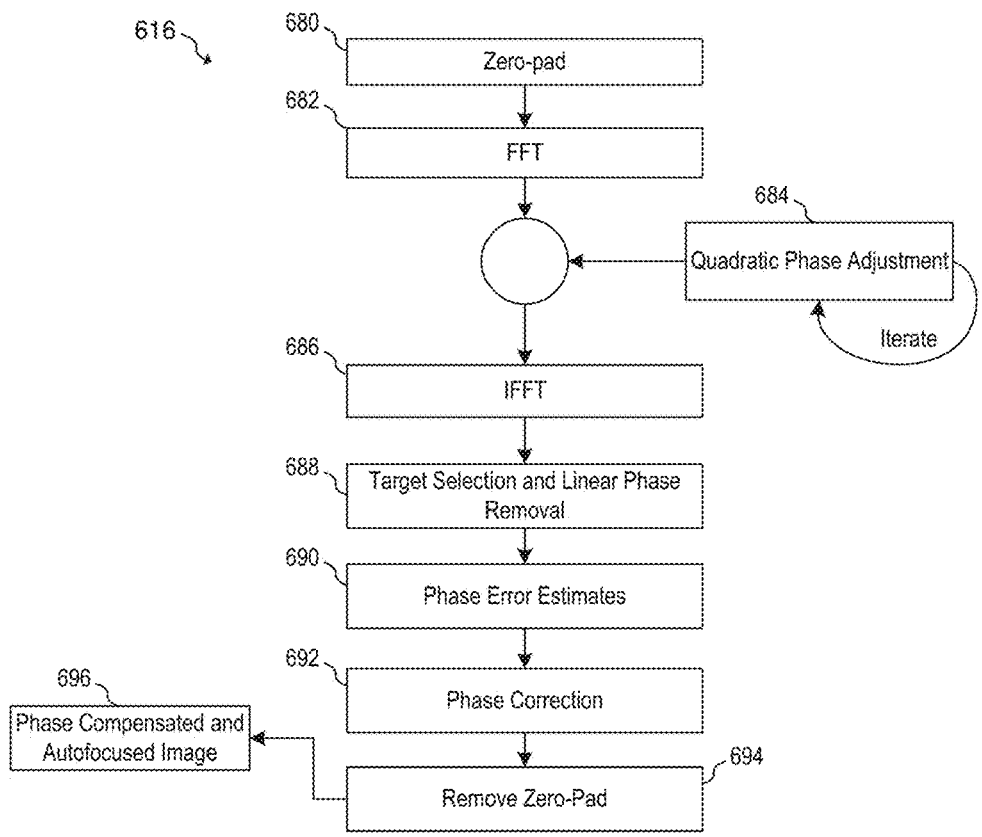
FIG. 6E illustrates flowchart of a method of performing an embodiment autofocus algorithm.

FIG. 6E illustrates flowchart of a method of performing an embodiment autofocus algorithm. In an embodiment, target bins are selected, spreading is approximated according to quadratic and linear phase components, and then the estimated spreading is compensated. In step 680 zero-padding is applied to the Doppler FFT image, and in step 682, an FFT is performed on the zero-padded Doppler FFT image. In step 684, an iterated quadratic phase adjustment is applied to the FFT results of step 682, and an IFFT is taken of the adjusted FFT in step 686. In step 688, a target selection and linear phase removal step is performed, in step 690 phase error estimates are performed, and in step 692, a phase correction is applied based on the phase error estimates of step 690. Zero-padding corresponding to the zero-padding of step 680 is removed to produce phase compensated and autofocused image 696.

Figure 7A:
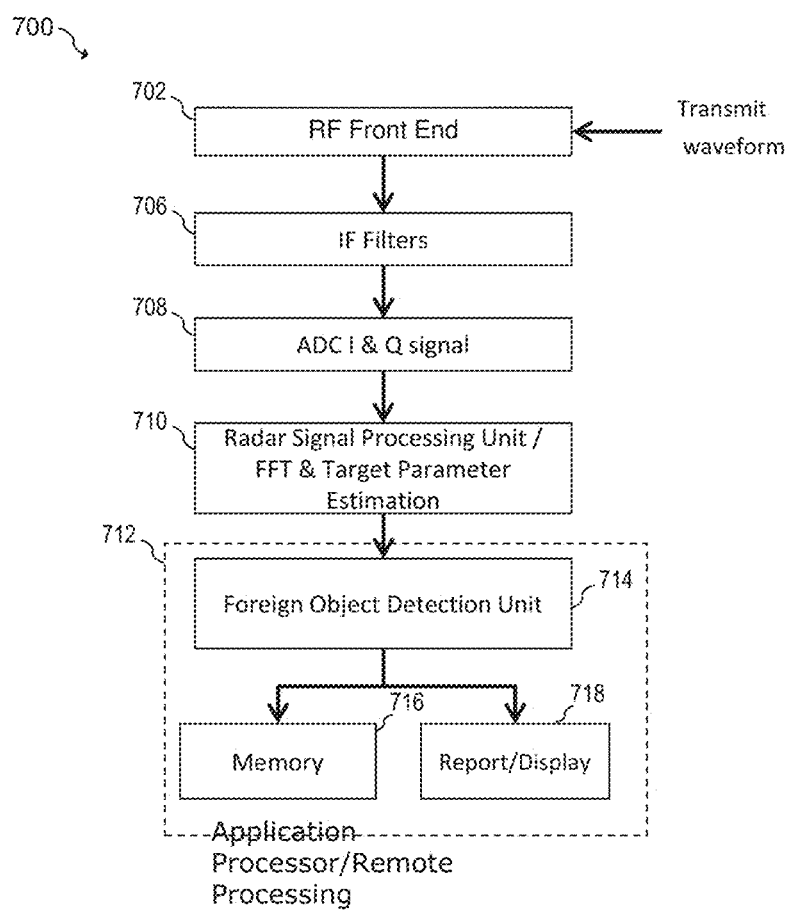
FIG. 7A illustrates a block diagram of a system configured to detect foreign objects in an air flow.

FIG. 7A illustrates a block diagram of an example millimeter-wave based radar system 700 that can be used to detect the presence of foreign objects 110 in an air-channel. System 700 can be used to implement, for example, the system depicted in FIG. 1A in which the line of sight of the radar system is perpendicular the air flow, or the system depicted in FIG. 1B in which the line of sign of the radar system is collinear with the air flow. As shown system 700 includes an RF front-end 702, IF filters 706, analog-to-digital converter 708, radar signal processing unit 710 and application processor/remote processing unit 712. RF front end 702 may include, for example, RF components such as frequency generation circuitry, power amplifiers, low noise amplifiers, a mixer, and antennas used to implement the high frequency portion of a millimeter-wave radar sensor. A mixer (not shown) within RF front-end 702 downconverts received millimeter-wave signals to a lower intermediate frequency (IF) signal, which may have an in-phase (I) and quadrature (Q) component. Analog-to-digital converter 708 digitizes the I and Q components of the IF signal, and outputs the digitized signals to radar signal processing unit 710 that performs the first signal processing steps on the digitized radar signal. In some embodiments, radar signal processing unit 710 performs the entire signal processing and machine learning task. For example, radar signal processing unit 710 may perform steps 604A/B to 620 described above with respect to FIG. 6A and method 650 described above with respect to FIG. 6D.

Application processor/remote processing unit 712 includes a foreign object detection unit 714 that performs an incident computation. In an embodiment, the incident computation involves recording the number of incidents of various types that occurs over a number of frames. During operation, foreign object detection unit 714 may access memory 716 and provide reports and display results as represented by report/display block 718. In some embodiments, application processor/remote processing unit 712 may be located remotely from blocks 702, 706, 708 and 710, for example, in a centrally located processor or in the cloud. The functions of application processor/remote processing unit 712 may be performed, for example, using software running on a processor and/or may be implemented using specialized processing hardware.

Figure 7B:
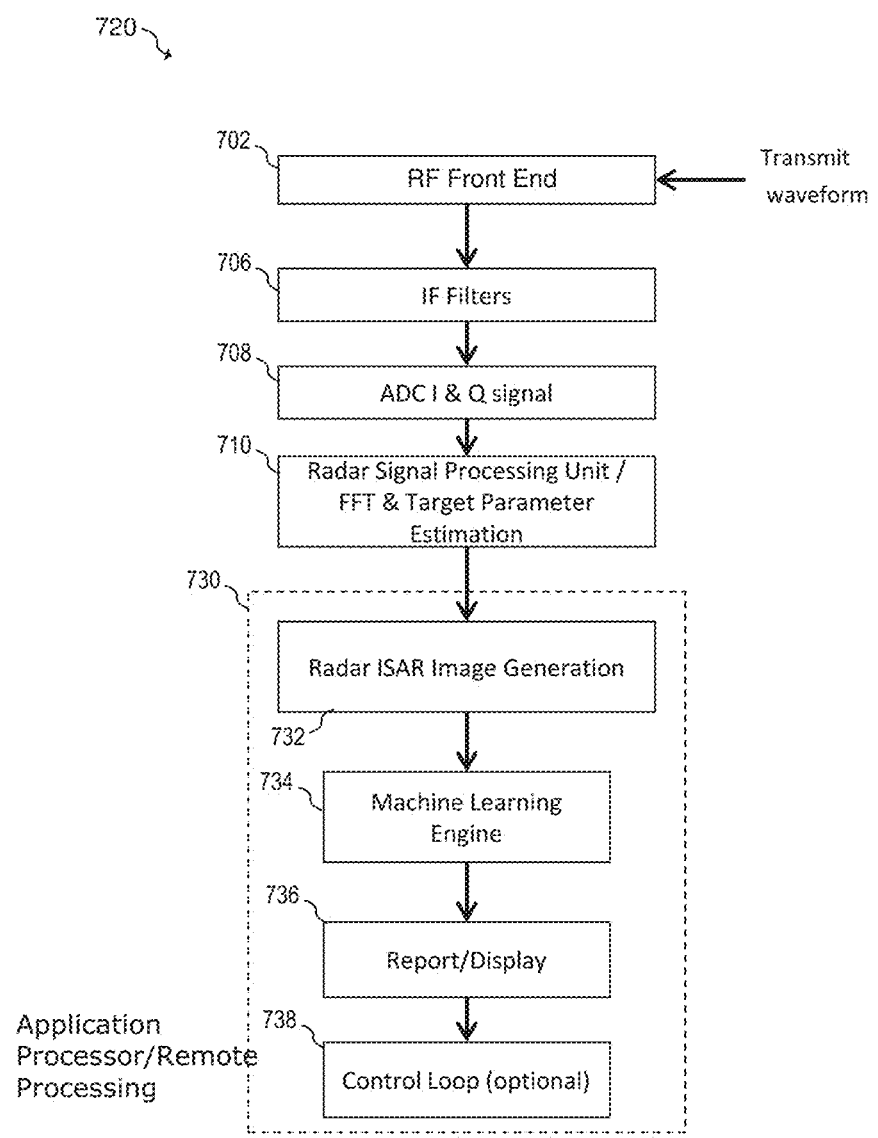
FIG. 7B illustrates a block diagram of a system configured to determine the structural health of a fan or rotating object.

FIG. 7B illustrates a block diagram of an example millimeter-wave based radar system 720 that can be used to monitor the health of a fan or other rotating objects. As shown, millimeter-wave based radar system 720 includes RF front-end 702, IF filters and amplifiers 706, analog-to-digital converter 708, and radar signal processing unit 710, which are described above with respect to FIG. 7A. Application processor/remote processing unit 730, however, includes radar ISAR image generation block 732, machine learning engine 734, report display unit 736 and optional control loop 738. In an embodiment, radar ISAR image generation block 732 performs the steps of generating the generating the combined range-Doppler ISAR image as described with respect to FIGS. 6A-6D. Machine learning engine 734 receives tracked micro-Doppler signatures produced by radar ISAR image generation block 732 and produces performance classification metrics that describe the performance of the fan being monitored. Report display block 736 communicates the determined performance classification metrics to a user and/or logs the performance classification for later retrieval. Optional control loop 738 may be used to adjust the settings of the fan being measured to optimal settings based on the fan health measurements. For example, if the measured vibration characteristics indicate that there is excessive wear on wear and tear on the fan, the system may respond by operating the fan at a reduced operation load by reducing the current to the fan in order to avoid further damage to the fan. This step could be incremental based on the present operating load parameters and the further wear and tear of the fan. Alternatively, other measured could be taken depending on the particular system and measured characteristics.

Figure 8A:
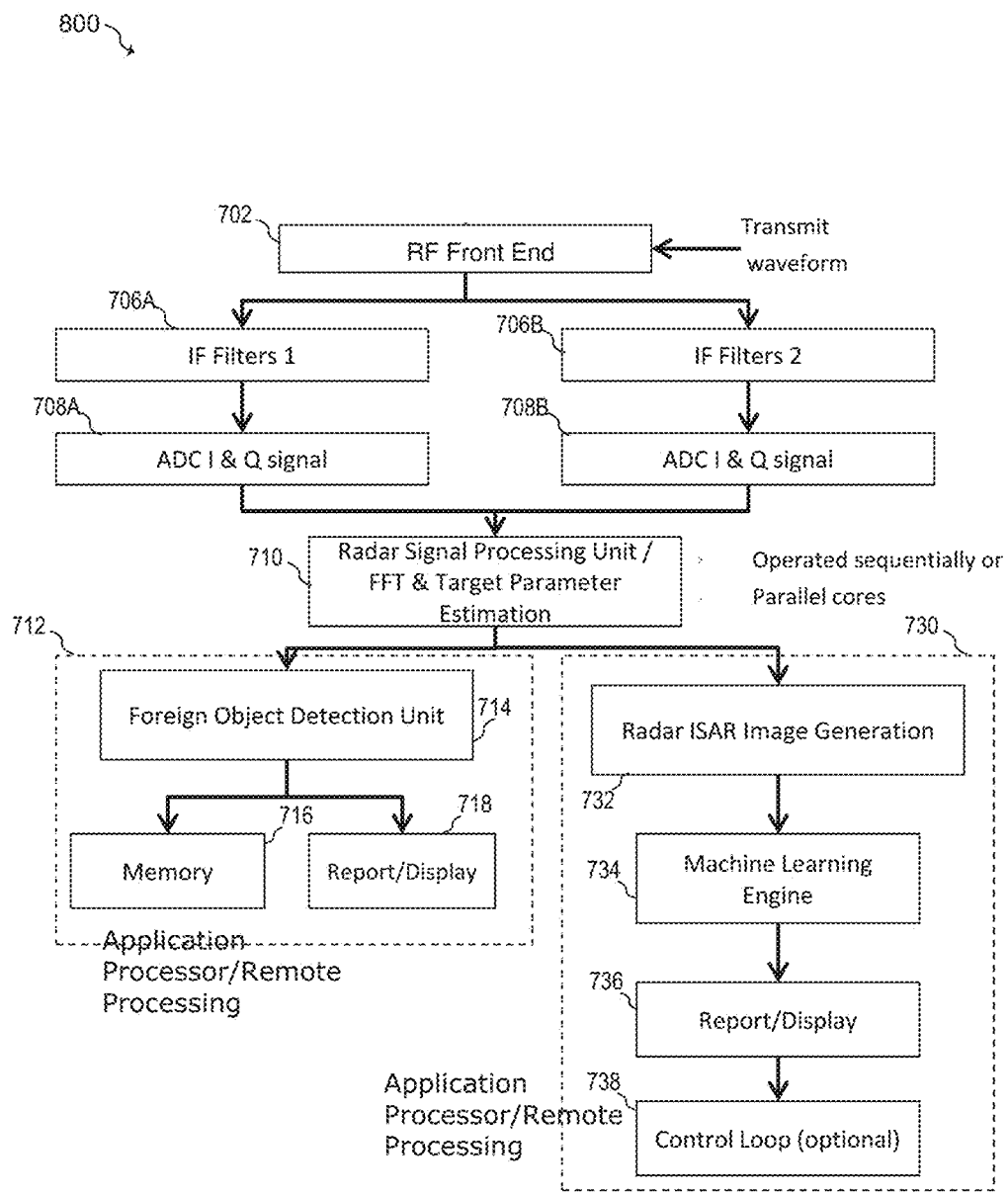
FIG. 8A illustrates a block diagram of a system configured to detect foreign objects in an air flow and determine the structural health of a fan or rotating object.

FIG. 8A illustrates a system 800 in which a single millimeter-wave radar system supports both foreign object detection and fan health monitoring. As shown, system 800 includes an RF front-end 702 and radar signal processing unit 710 that are described above with respect to FIGS. 7A and 7B. However, in one embodiment, IF filters 706A and 706B and analog-to-digital converters 708A and 708B are split each split into two separate units in order to support different filter settings for flying object detection and vibration characteristic analysis. However, in alternative embodiments, a single filter and ADC can be used. For detection tasks directed to detecting flying objects that travel in the direction of the fan from the radar sensor, the IF section filter settings are tuned to have a passband in the frequency bins associated with these object. For tasks directed to detecting objects close to the fan or detecting the motion of the fan itself, the ID filter settings are tuned to have a passband associated with targets in close proximity to the fan. This also has the effect of attenuating reflections represented by range bins outside of the area of interest. As shown, system 800 has both an application processor/remote processing unit 712 devoted to detecting foreign objects as described above with respect to FIG. 7A and an application processor/remote processing unit 730 devoted to fan health monitoring as described above with respect to FIG. 7B. In some embodiments, processor/remote processing units 712 and 730 may be implemented using a single processor and operated in a time multiplexed manner, while in other embodiment, processor/remote processing units 712 and 730 are separate units that run in parallel.

Figure 8B:
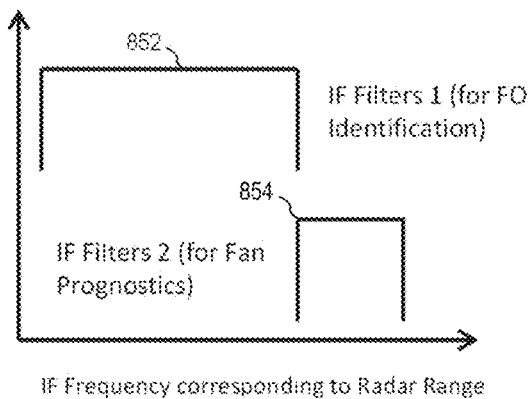
FIG. 8B illustrates a graph showing embodiment IF filter passbands.

In some embodiments, IF filters 706A and 706B have different passbands as described above. For example, as shown in FIG. 8B, IF filter 706A has as lower frequency passband 852 that is devoted to filtering IF signals used for foreign object identification, while IF filter 706B has a higher frequency passband 854 that is devoted to filtering IF signals used for fan health analysis.

Figure 9:
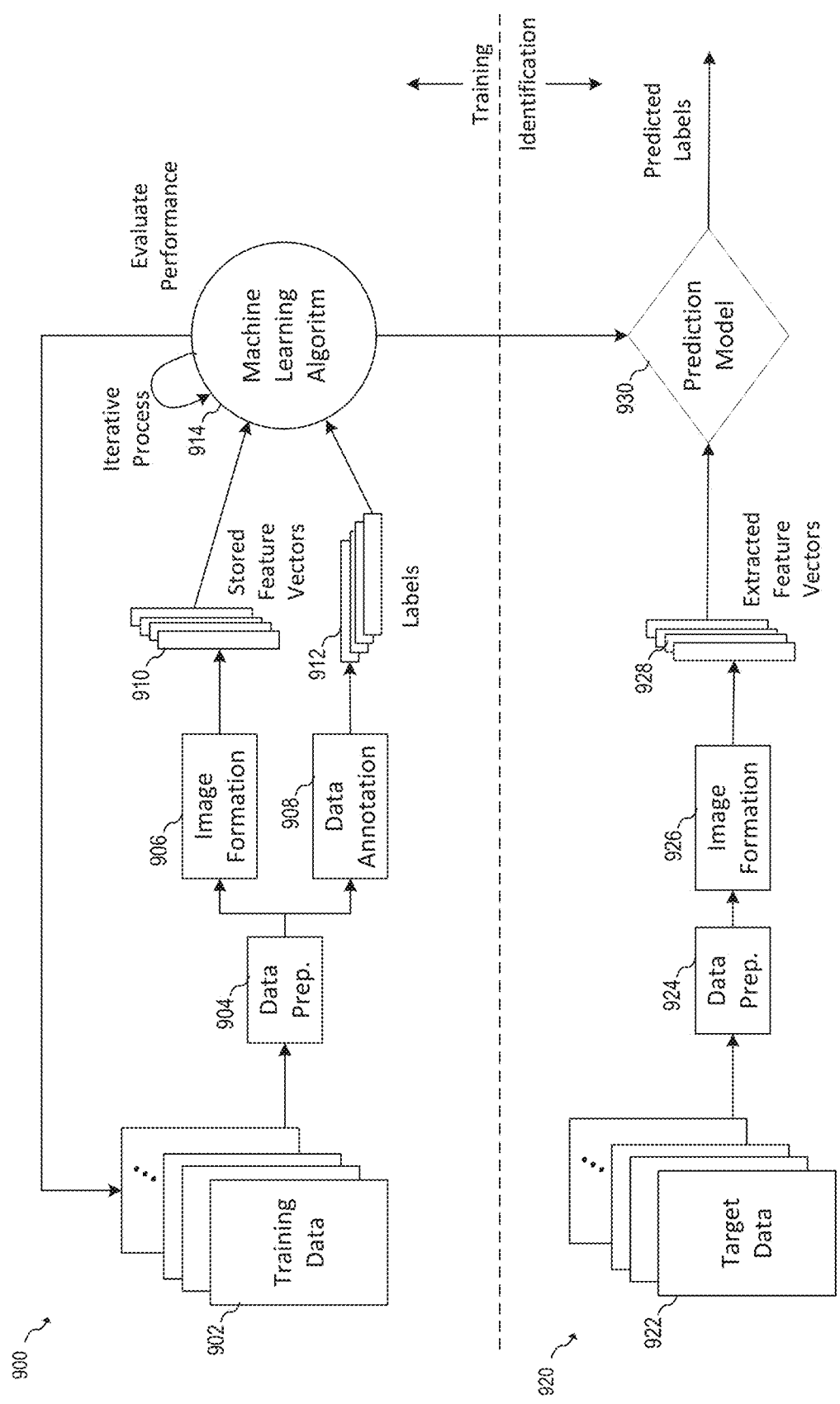
FIG. 9 illustrates a block diagram showing a machine learning pipeline for feature extraction and identification.

FIG. 9 illustrates a block diagram showing a machine learning pipeline for machine language based feature extraction and identification that can be used to classify the extracted micro-Doppler signatures into fan performance categories as described above with respect to step 662 in FIG. 6D. The top portion 900 of FIG. 9 is devoted to the processing storage of features for comparison to later measurements. The data and steps shown in this portion represent the actions performed when radar measurements are performed and processed for a classification category. The bottom portion 920 is devoted to the processing and comparison of new measurements for comparison to stored data. These data and steps represent the actions performed when the system is identifying and validating a fan performance category during normal operations.

As shown in the top portion 900 of FIG. 9, training data 902 is transformed into stored feature vectors 910 and corresponding labels 912. Training data 902 represents the raw data produced by one or more sets of radar sensor measurements, feature vectors 910 represent sets of generated vectors that are representative of the training data 902 and labels 912 represent user metadata associated with the corresponding training data 902 and feature vectors 910. As shown, training data 902 is transformed into feature vectors 910 using image formation algorithms from the range-Doppler ISAR image. Data preparation block 904 represents the initial formatting of raw sensor data, and data annotation block 908 represents the derivation of fan status identification from training data 902. In some embodiments labels 912 include a label that corresponds to a fan health category.

During operation, one or more radar images are taken of a rotating object using millimeter-wave sensors described above. In some cases, multiple radar images are recorded to increase the accuracy of identification. Machine learning algorithm 914 evaluates the ability of a prediction model 930 to identify feature vectors and iteratively updates training data 902 to increase the classification accuracy of the algorithm. In some embodiments, image formation algorithm 906 corresponds to ISAR image generation method 600 shown in FIG. 6A. The training performance of the machine learning algorithm may be determined by calculating the cross-entropy performance. In some embodiments, the machine learning algorithm 914 iteratively adjusts image formation parameters for a classification accuracy of at least 90%. Alternatively, other classification accuracies could be used.

Machine learning algorithm 914 may be implemented using a variety of machine learning algorithms known in the art. For example, a random forest algorithm or neural network algorithm, such as a ResNet-18 or other neural network algorithm known in the art, may be used for classification and analysis of stored feature vectors 910. During the iterative optimization of stored feature vectors 910, a number of parameters of image formation 906 may be updated. Examples of image formation parameters that may be updated using the machine learning process include but are not limited to: the number of chirps being averaged during the calculation of the range FFT and/or the azimuth FFTs; the windowing and zero padding of the range FFT and/or the azimuth FFTs; the number of range points selected and polynomial order for autofocus algorithms.

Once the system has been trained using reference training data 902 that represents reference radar measurements made on a fans in various operation conditions (e.g., new fans, nominally operating fans, and fans in one or more failing or marginally operating modes), new target data 922 is received by embodiment millimeter-wave radar sensors during the course of identifying fan modes. Data preparation block 924 prepares the new target data 922 for image formation, and image formation block 926 forms new extracted feature vectors 928 using, for example, method 6—described above with respect to FIG. 6A. Prediction model 930 utilizes machine learning algorithm 914 to match new extracted feature vectors 928 to a stored feature vector 910. When a match is identified a predicted label is provided that identifies the new feature vector. In some embodiments, data from the stored labels 912 is provided as a predicted label. Prediction model 930 is may be a machine learning model with optimal parameters computed/evaluated through a machine learning algorithm.

Figure 10:
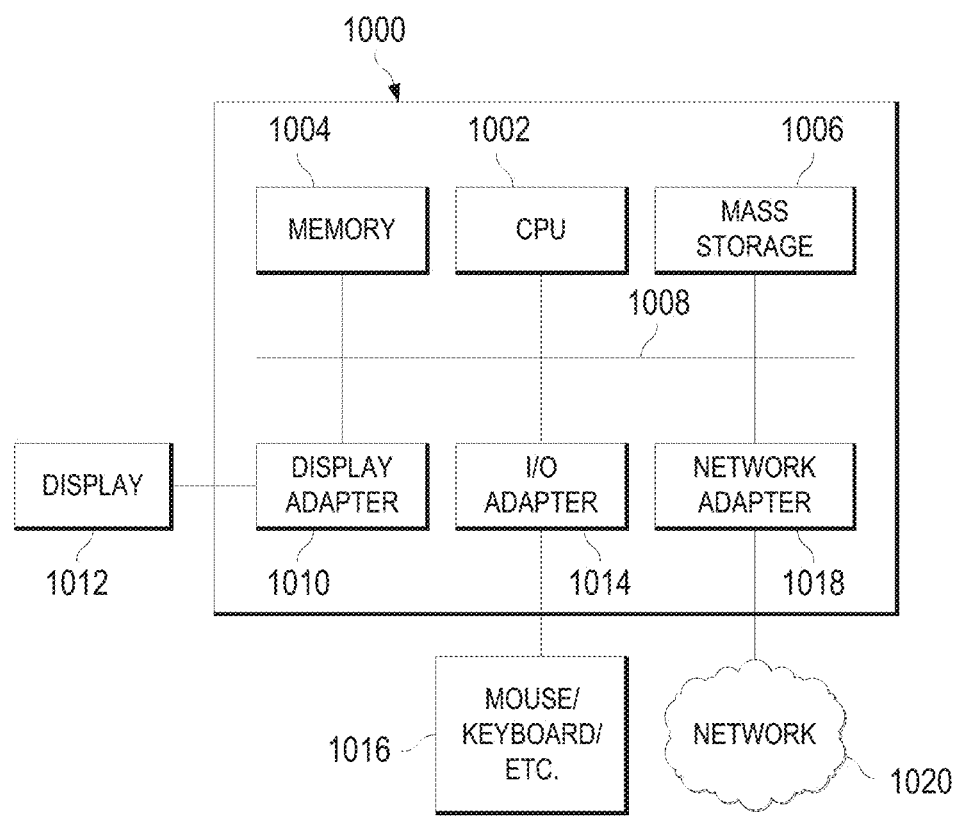
FIG. 10 illustrates a block diagram of a processing system that may be used to implement portions of embodiment systems.

Referring now to FIG. 10, a block diagram of a processing system 1000 is provided in accordance with an embodiment of the present invention. The processing system 1000 depicts a general-purpose platform and the general components and functionality that may be used to implement portions of the embodiment radar system and/or an external computer or processing device interfaced to the embodiment radar system. The processing system 1000 may include, for example, a central processing unit (CPU) 1002, memory 1004, and a mass storage device 1006 connected to a bus 1008 configured to perform the processes discussed above. The processing system 1000 may further include, if desired or needed, a display adapter 1010 to provide connectivity to a local display 1012 and an input-output (I/O) Adapter 1014 to provide an input/output interface for one or more input/output devices 1016, such as a mouse, a keyboard, printer, tape drive, CD drive, flash drive or the like.

The processing system 1000 also includes a network interface 1018, which may be implemented using a network adaptor configured to be coupled to a wired link, such as a network cable, USB interface, or the like, and/or a wireless/cellular link for communications with a network 1020. The network interface 1018 may also comprise a suitable receiver and transmitter for wireless communications. It should be noted that the processing system 1000 may include other components. For example, the processing system 1000 may include power supplies, cables, a motherboard, removable storage media, cases, and the like. These other components, although not shown, are considered part of the processing system 1000.

Example embodiments of the present invention are summarized here. Other embodiments can also be understood from the entirety of the specification and the claims filed herein.

Example 1. A method of monitoring an air flow, the method including: performing a plurality of radar measurements using a millimeter-wave radar sensor with a line of sight having a component perpendicular to a direction of an air flow; detecting an object in the air flow based on the plurality of radar measurements; calculating a displacement of the object and a size of the object based on the plurality of radar measurements; estimating a velocity of the object based on the calculated displacement; and calculating a risk metric based on the calculated size of the object and estimated velocity of the object.

Example 2. The method of example 1, where detecting the size of the object includes: forming a two-dimensional radar image from the plurality of radar measurements, the two-dimensional radar image having a range axis and an azimuth axis; iteratively applying a two-dimensional Gaussian filter to the two-dimensional radar image with a changing filter variance; determining a maximum filter variance at which an increase of a sum amplitude of the Gaussian filtered two-dimensional radar image is below a first threshold to form a variance value; and determining the sum amplitude of the Gaussian filtered two-dimensional radar image.

Example 3. The method of example 2, further including: determining size category based on the determined maximum filter variance; determining a radar cross section (RCS) category based on the sum amplitude; determining a velocity category based on a magnitude of the estimated velocity; and determining an incidence category based on an angle of the estimated velocity.

Example 4. The method of example 3, where: determining the size category includes categorizing the detected object in a "large object" category when the maximum filter variance is greater than a first size threshold value and categorizing the detected object in a "small object" category when the maximum filter variance is not greater than a first size threshold value; determining the RCS category includes categorizing the detected object in a first RCS category when the sum amplitude is greater than a first RCS threshold, categorizing the detected object in a first RCS category when the sum amplitude is greater than a second RCS threshold and not greater than the first RCS threshold, and categorizing the detected object in a third RCS category when the sum amplitude not greater than the second RCS threshold; determining the velocity category includes categorizing the detected object in a "high velocity" category when the magnitude of the estimated velocity is greater than a first velocity threshold value and categorizing the detected object in a "low object" category when the magnitude of the estimated velocity is not greater than a first velocity threshold value; and determining the incidence category includes categorizing the detected object in a "direct" category when the angle of the estimated velocity with respect to the direction of the air flow is less than a first angle threshold, and categorizing the detected object in an "indirect" category when the angle of the estimated velocity with respect to the direction of the air flow is not less than the first angle threshold.

Example 5. The method of examples 2 or 3, where calculating the displacement of the object includes: forming a two-dimensional radar image for each radar measurement of the plurality of radar measurements, the two-dimensional radar image having a range axis and an azimuth axis; estimating a position of the detected object for each radar measurement of the plurality of radar measurements based on the two-dimensional radar images; and calculating a Euclidean distance between the estimated position of the detected object from a first radar measurement of the plurality of radar measurements and the estimated position of the detected object from a second radar measurement of the plurality of radar measurements.

Example 6. The method of example 5, where estimating the velocity of the object includes determining a magnitude of the velocity of the detected object and an angle of the velocity of the detected object based on the calculated Euclidian distance.

Example 7. The method of one of example 1-6, where the performing the plurality of radar measurements includes forming a beam using an antenna array of the millimeter-wave radar sensor.

Example 8. The method of one of examples 1-7, where calculating the risk metric based on the calculated size of the object and estimated velocity of the object includes performing a weighted sum of the calculated size of the object and estimated velocity.

Example 9. The method of one of examples 1-8, further including transmitting an alert when the risk metric is greater than a risk metric threshold.

Example 10. The method of one of examples 1-9, where the air flow occurs within a duct, and at least a portion of the duct is within the line of sight of the millimeter-wave radar sensor.

Example 11. A method of monitoring an air flow, the method including: performing a plurality of radar measurements using a millimeter-wave radar sensor having a line of sight collinear to a direction of an air flow; detecting an object in the air flow based on the plurality of radar measurements; calculating a size and trajectory of the detected object based on the plurality of radar measurements; and calculating a risk metric based on the calculated size of the object and calculated trajectory of the object.

Example 12. The method of example 11, where calculating the trajectory of the object includes: performing a range FFT from the plurality of radar measurements; performing a Doppler FFT from the range FFT to produce a two-dimensional range-Doppler map; and estimating a range, azimuth angle and elevation angle of the detected object based on from the two-dimensional range-Doppler map.

Example 13. The method of example 12, where calculating the trajectory of the detected object further includes determining a velocity of the detected object.

Example 14. The method of one of example 12 and 13, where estimating the azimuth angle and elevation angle includes applying a minimum variance distortionless response (MVDR) algorithm to the two-dimensional range-Doppler map.

Example 15. The method of one of examples 12-14, where detecting the size of the object includes: performing a range FFT from the plurality of radar measurements; and determining a radar cross section (RCS) from the range FFT.

Example 16. The method of one of example 11-15, where calculating the risk metric based on the calculated size of the object and calculated trajectory the object includes performing a weighted sum of the calculated size of the object and calculated trajectory of the object.

Example 17. The method of example 16, further including transmitting an alert when the risk metric is greater than a risk metric threshold.

Example 18. The method of one of example 11-17, further including determining a structural integrity of a fan generating the air flow from the plurality of radar measurements.

Example 19. The method of example 18, where the fan is disposed adjacent to or within a duct, and at least a portion of the duct is within the line of sight of the millimeter-wave radar sensor.

Example 20. The method of one of example 18 or 19, where determining the structural integrity of the fan includes: creating an inverse synthetic-aperture radar (ISAR) image from the plurality of radar measurements; extracting a micro-Doppler signature of the fan from the ISAR image; and estimating the structural integrity of the fan from the extracted micro-Doppler signature.

Example 21. The method of example 20, where the estimating the structural integrity from the extracted micro-Doppler signature includes classifying the extracted micro-Doppler signature using a machine learning algorithm.

Example 22. The method of one of example 18-21, further including time multiplexing the steps of detecting the object in the air flow and determining the structural integrity of the fan.

Example 23. The method of one of examples 18-21, further including frequency multiplexing the steps of detecting the object in the air flow and determining the structural integrity of the fan.

Example 24. A method of monitoring a structural integrity of a rotating object, the method including: performing a plurality of radar measurements of the rotating object using a plurality millimeter-wave radar sensors; creating an inverse synthetic-aperture radar (ISAR) image from the plurality of radar measurements; extracting a micro-Doppler signature of the rotating object from the ISAR image; and estimating the structural integrity of the rotating object from the extracted micro-Doppler signature.

Example 25. The method of example 24, further including classifying the extracted micro-Doppler signature using a machine learning algorithm.

Example 26. The method of one of examples 24 or 25, further including determining a vibrational mode of the rotating object from the extracted micro-Doppler signature.

Example 27. A system for monitoring an air flow, the system including: a millimeter-wave radar sensor having a line of sight having a component perpendicular to a direction of an air flow; a processor coupled to the millimeter-wave radar sensor, the processor configured to detect an object in the air flow based on radar measurements from the millimeter-wave radar sensor, calculate a displacement of the object and a size of the object based on the radar measurements, estimate a velocity of the object based on the calculated displacement; and calculate a risk metric based on the calculated size of the object and estimated velocity of the object.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of monitoring an air flow, the method comprising:
   performing a plurality of radar measurements using a millimeter-wave radar sensor with a line of sight having a component perpendicular to a direction of the air flow;
   detecting an object in the air flow based on the plurality of radar measurements;
   calculating a displacement of the object and a size of the object based on the plurality of radar measurements;
   estimating a velocity of the object based on the calculated displacement; and
   calculating a risk metric based on the calculated size of the object and estimated velocity of the object.

2. The method of claim 1, wherein detecting the size of the object comprises:
   forming a two-dimensional radar image from the plurality of radar measurements, the two-dimensional radar image having a range axis and an azimuth axis;
   iteratively applying a two-dimensional Gaussian filter to the two-dimensional radar image with a changing filter variance;
   determining a maximum filter variance at which an increase of a sum amplitude of the Gaussian filtered two-dimensional radar image is below a first threshold to form a variance value; and
   determining the sum amplitude of the Gaussian filtered two-dimensional radar image.

3. The method of claim 2, further comprising:
   determining size category based on the determined maximum filter variance;
   determining a radar cross section (RCS) category based on the sum amplitude;
   determining a velocity category based on a magnitude of the estimated velocity; and
   determining an incidence category based on an angle of the estimated velocity.

4. The method of claim 3, wherein:
   determining the size category comprises categorizing the detected object in a "large object" category when the maximum filter variance is greater than a first size threshold value and categorizing the detected object in a "small object" category when the maximum filter variance is not greater than the first size threshold value;
   determining the RCS category comprises categorizing the detected object in a first RCS category when the sum amplitude is greater than a first RCS threshold, categorizing the detected object in a second RCS category when the sum amplitude is greater than a second RCS threshold and not greater than the first RCS threshold, and categorizing the detected object in a third RCS category when the sum amplitude not greater than the second RCS threshold;

determining the velocity category comprises categorizing the detected object in a "high velocity" category when the magnitude of the estimated velocity is greater than a first velocity threshold value and categorizing the detected object in a "low object" category when the magnitude of the estimated velocity is not greater than the first velocity threshold value; and determining the incidence category comprises categorizing the detected object in a "direct" category when the angle of the estimated velocity with respect to the direction of the air flow is less than a first angle threshold, and categorizing the detected object in an "indirect" category when the angle of the estimated velocity with respect to the direction of the air flow is not less than the first angle threshold.

5. The method of claim 2, wherein calculating the displacement of the object comprises:

forming the two-dimensional radar image for each radar measurement of the plurality of radar measurements;

estimating a position of the detected object for each radar measurement of the plurality of radar measurements based on the two-dimensional radar images; and calculating a Euclidean distance between the estimated position of the detected object from a first radar measurement of the plurality of radar measurements and the estimated position of the detected object from a second radar measurement of the plurality of radar measurements.

6. The method of claim 5, wherein estimating the velocity of the object comprises determining a magnitude of the velocity of the detected object and an angle of the velocity of the detected object based on the calculated Euclidian distance.

7. The method of claim 1, wherein the performing the plurality of radar measurements comprises forming a beam using an antenna array of the millimeter-wave radar sensor.

8. The method of claim 1, wherein calculating the risk metric based on the calculated size of the object and the estimated velocity of the object comprises performing a weighted sum of the calculated size of the object and the estimated velocity.

9. The method of claim 1, further comprising transmitting an alert when the risk metric is greater than a risk metric threshold.

10. The method of claim 1, wherein the air flow occurs within a duct, and at least a portion of the duct is within the line of sight of the millimeter-wave radar sensor.

11. A method of monitoring an air flow, the method comprising:

performing a plurality of radar measurements using a millimeter-wave radar sensor having a line of sight collinear to a direction of the air flow;

detecting an object in the air flow based on the plurality of radar measurements;

calculating a size and trajectory of the detected object based on the plurality of radar measurements; and calculating a risk metric based on the calculated size of the object and calculated trajectory of the object.

12. The method of claim 11, wherein calculating the trajectory of the object comprises:

performing a range FFT from the plurality of radar measurements;

performing a Doppler FFT from the range FFT to produce a two-dimensional range-Doppler map; and estimating a range, azimuth angle and elevation angle of the detected object based on from the two-dimensional range-Doppler map.

13. The method of claim 12, wherein calculating the trajectory of the detected object further comprises determining a velocity of the detected object.

14. The method of claim 12, wherein estimating the azimuth angle and the elevation angle comprises applying a minimum variance distortionless response (MVDR) algorithm to the two-dimensional range-Doppler map.

15. The method of claim 12, wherein detecting the size of the object comprises:

determining a radar cross section (RCS) from the range FFT.

16. The method of claim 11, wherein calculating the risk metric based on the calculated size of the object and the calculated trajectory the object comprises performing a weighted sum of the calculated size of the object and the calculated trajectory of the object.

17. The method of claim 16, further comprising transmitting an alert when the risk metric is greater than a risk metric threshold.

18. The method of claim 11, further comprising determining a structural integrity of a fan generating the air flow from the plurality of radar measurements.

19. The method of claim 18, wherein the fan is disposed adjacent to or within a duct, and at least a portion of the duct is within the line of sight of the millimeter-wave radar sensor.

20. The method of claim 18, wherein determining the structural integrity of the fan comprises:

creating an inverse synthetic-aperture radar (ISAR) image from the plurality of radar measurements;

extracting a micro-Doppler signature of the fan from the ISAR image; and estimating the structural integrity of the fan from the extracted micro-Doppler signature.

21. The method of claim 20, wherein the estimating the structural integrity from the extracted micro-Doppler signature comprises classifying the extracted micro-Doppler signature using a machine learning algorithm.

22. The method of claim 18, further comprising time multiplexing the steps of detecting the object in the air flow and determining the structural integrity of the fan.

23. The method of claim 18, further comprising frequency multiplexing the steps of detecting the object in the air flow and determining the structural integrity of the fan.

24. A method of monitoring a structural integrity of a rotating object, the method comprising:

performing a plurality of radar measurements of the rotating object using a plurality millimeter-wave radar sensors;

creating an inverse synthetic-aperture radar (ISAR) image from the plurality of radar measurements;

extracting a micro-Doppler signature of the rotating object from the ISAR image; and estimating the structural integrity of the rotating object from the extracted micro-Doppler signature.

25. The method of claim 24, further comprising classifying the extracted micro-Doppler signature using a machine learning algorithm.

26. The method of claim 24, further comprising determining a vibrational mode of the rotating object from the extracted micro-Doppler signature.

27. A system for monitoring an air flow, the system comprising:
- a millimeter-wave radar sensor having a line of sight having a component perpendicular to a direction of the air flow;
- a processor coupled to the millimeter-wave radar sensor, the processor configured to
    - detect an object in the air flow based on radar measurements from the millimeter-wave radar sensor,
    - calculate a displacement of the object and a size of the object based on the radar measurements,
    - estimate a velocity of the object based on the calculated displacement; and
    - calculate a risk metric based on the calculated size of the object and estimated velocity of the object.

* * * * *